(12) United States Patent
Hannington et al.

(10) Patent No.: US 8,368,831 B2
(45) Date of Patent: Feb. 5, 2013

(54) OLIGOSILOXANE MODIFIED LIQUID CRYSTAL FORMULATIONS AND DEVICES USING SAME

(75) Inventors: Jonathan Paul Hannington, Midland, MI (US); Terry Victor Clapp, Bishop's Stortford (GB); Fumito Nishida, Midland, MI (US); Russell Keith King, Midland, MI (US); Omar Farooq, Saginaw, MI (US); Martin Grasmann, Midland, MI (US); William Alden Crossland, Harlow (GB); Harry James Coles, Sutton Ely (GB); Anthony Bernard Davey, Cambridge (GB); Huan Xu, Cambridge (GB); Oliver Hadeler, Cambridge (GB); Mykhaylo Pivnenko, Cambridge (GB)

(73) Assignees: Dow Corning Corporation, Midland, MI (US); Cambridge Enterprise Ltd., Cambridge (GB)

( * ) Notice: Subject to any disclaimer, the term of this patent is extended or adjusted under 35 U.S.C. 154(b) by 248 days.

(21) Appl. No.: 12/738,677

(22) PCT Filed: Oct. 19, 2007

(86) PCT No.: PCT/US2007/081940
§ 371 (c)(1),
(2), (4) Date: Jun. 28, 2010

(87) PCT Pub. No.: WO2009/051598
PCT Pub. Date: Apr. 23, 2009

(65) Prior Publication Data
US 2010/0283927 A1   Nov. 11, 2010

(51) Int. Cl.
*G02F 1/136* (2006.01)
(52) U.S. Cl. ........................................... 349/41
(58) Field of Classification Search .................. None
See application file for complete search history.

(56) References Cited

U.S. PATENT DOCUMENTS

| | | | |
|---|---|---|---|
| 4,367,924 A | 1/1983 | Clark et al. | |
| 4,563,059 A | 1/1986 | Clark et al. | |
| 5,498,368 A | 3/1996 | Coles | |
| 5,720,898 A | 2/1998 | Nohira et al. | |
| 5,748,164 A | 5/1998 | Handschy et al. | |
| 5,972,241 A | 10/1999 | Johnson et al. | |
| 6,051,639 A | 4/2000 | Mehl et al. | |
| 6,277,451 B1 | 8/2001 | Mehl et al. | |
| 6,507,330 B1 | 1/2003 | Handschy et al. | |
| 6,737,124 B2 | 5/2004 | Gough et al. | |
| 6,783,812 B2 | 8/2004 | Wand et al. | |
| 6,838,128 B1 | 1/2005 | Wand et al. | |
| 6,870,163 B1 * | 3/2005 | Xue et al. | 250/341.1 |
| 7,083,832 B2 * | 8/2006 | Wand et al. | 428/1.1 |
| 7,195,719 B1 * | 3/2007 | Wand et al. | 252/299.61 |
| 7,351,452 B2 | 4/2008 | Goodby et al. | |
| 7,759,511 B2 * | 7/2010 | Cheong et al. | 556/431 |
| 2002/0130299 A1 | 9/2002 | Wand et al. | |
| 2003/0003245 A1 | 1/2003 | Gough et al. | |
| 2004/0206933 A1 | 10/2004 | Goodby et al. | |

FOREIGN PATENT DOCUMENTS

| | | |
|---|---|---|
| EP | 0032362 A1 | 7/1981 |
| EP | 0778960 B1 | 10/2001 |
| GB | 2274652 A | 8/1994 |
| GB | 2317186 A1 | 3/1998 |
| WO | 9736908 A1 | 10/1997 |
| WO | 9736947 A1 | 10/1997 |
| WO | 9932576 A2 | 7/1999 |
| WO | 03024903 A1 | 3/2003 |
| WO | 03040074 A1 | 5/2003 |
| WO | 03040812 A1 | 5/2003 |
| WO | 2009054855 A1 | 4/2009 |

OTHER PUBLICATIONS

U.S. Office Action pertaining to U.S. Appl. No. 12/296,612, dated Mar. 23, 2011.
U.S. Office Action pertaining to U.S. Appl. No. 12/296,612, dated Oct. 12, 2010.
Sunohara, et al., "A Novel Class of Materials for Ferroelectric Liquid Crystals Containing Siloxy Chain End Groups", Feb. 13, 1993, pp. 283-294; Liquid Crystals, vol. 13, No. 2; Taylor & Francis Ltd.
Newton, et al., "A New Series of Low Molar Mass Ferroelectric Organosiloxanes With Unusual Electro-Optic Properties", 1993, pp. 379-387; Ferroelectrics, vol. 148; Gordon and Breach Science Publishers S.A., USA.
Goodby, et al., "Chiral Liquid Crystals for Ferroelectric, Electroclinic and Antiferroelectric Displays and Photonic Devices", 2000, pp. 2-14; Liquid Crystal Materials, Devices, and Flat Panel Displays, Proceedings of SPIE vol. 3955.

(Continued)

*Primary Examiner* — Sung Pak
(74) *Attorney, Agent, or Firm* — Brinks Hofer Gilson & Lione

(57) ABSTRACT

A liquid crystal formulation is described. The liquid crystal formulation comprises a first oligosiloxane-modified nano-phase segregating liquid crystalline material; and at least one additional material selected from a second oligosiloxane-modified nano-phase segregating liquid crystalline material, non-liquid crystalline oligosiloxane-modified materials, organic liquid crystalline materials, or organic non-liquid crystalline materials, wherein the liquid crystal formulation is nano-phase segregated in the SmC* phase, has an I→SmC* phase transition, with a SmC* temperature range from about 15° C. to about 35° C., has a tilt angle of about 22.5°±6° or about 45°±6°, and has a spontaneous polarization of less than about 50 nC/cm2, and a rotational viscosity of less than about 600 cP. Devices containing liquid crystal formulations are also described. The device has a stable bookshelf geometry, bistable switching, and isothermal electric field alignment, a response time of less than 500 μs when switched between two stable states, and an electric drive field of less than about 30 V/μm.

17 Claims, 6 Drawing Sheets

OTHER PUBLICATIONS

Walba, et al., "Chiral SmA* Materials for Display Applications?", 2007, pp. 585-588; Journal of the SID, USA.

Owen, et al., "Comparison of Mesomorphic Behaviour and Electro-Optic Properties of Ferroelectric Mesogens With and Without Disiloxane End-Groups", 1995, pp. 563-575; Mol. Cryst. Liq. Cryst., vol. 265; Overseas Publishers Association, Malaysia.

Manolis, et al., "Control of the Electro-Optic Bistability of Some Ferroelectric Liquid Crystals Useful for Binary Phase Optical Modulators", 2000, pp. 305-314; Mol. Cryst. And Liq. Cryst., vol. 351; Overseas Publishers Association, Malaysia.

Lagerwall, et al., "Current Topics in Smectic Liquid Crystal Research", 2006, pp. 20-45; www.Chemphyschem.org.

Crossland, et al., "Electro-Optical Bistability in Ferroelectric Liquid Crystal Switching Devices for Use in Displays and Real-Time Holography", 2004, pp. 3-23; Ferroelectrics, vol. 312, Taylor & Francis, UK.

Hadeler, et al., "Fast Electro-Optic Liquid Crystal Switch and Attenuator With Large Extinction Ratio at 1550 nm", pp. 1-6.

Robinson, et al., "Ferroelectric and Antiferroelectric Low Molar Mass Organosiloxane Liquid Crystals", 1998, pp. 301-307; Liquid Crystals, vol. 25, No. 3; Taylor & Francis Ltd.

Redmond, et al., "Ferroelectric and Electroclinic Characterisation of a New Organic Siloxane Bimesogen", 1993, pp. 323-336; Ferroelectrics, vol. 148; Gordon and Breach Science Publishers S.A., USA.

Wilkinson, et al., "Liquid Crystal Materials and Applications for the Next Generation of Microdisplays", 2003, pp. 57/[171[-65/[179]; Mol Cryst. Liq. Cryst., vol. 401; Taylor & Francis, Inc., UK.

Pivnenko, et al., "Optical and Electro-Optical Properties of Bimesogenic Organosiloxane Antiferroelectric Liquid Crystals With Molecular Tilt Approaching 45 Degrees", Feb. 2005, pp. 173-181; Liquid Crystals, vol. 32, No. 2, Taylor & Francis, http://www.tandf.co.uk/journals, UK.

De Hondt, et al., "Perylene-Baseed Fluorescent Liquid Crystal Dye guest-Host Mixtures", 2001, pp. 263-270; Mol. Cryst and Liq. Cryst., vol. 366; Overseas Publishers Association, USA.

Naciri, et al., "Novel Ferroelectric and Electroclinic Organosiloxane Liquid Crystals", 1995, pp. 1397-1402; Chem. Mater., vol. 7; American Chemical Society.

Pivnenko, et al., "Novel Electroclinic Organosiloxane Materials for Optoelectronic Devices", pp. 1-12; Proceedings of SPIE 5289, SPIE/IS, Bellingham WA, USA.

Shilov, et al., "Segmental Orientation and Mobility of Ferroelectric Liquid Crystal Polymers", 1997, pp. 203-210; Liquid Crystals, vol. 22, No. 2; Taylor & Francis Ltd.

Poths, et al., "Dimesogenic Ferroelectric Polysiloxanes", May 1994, pp. 433-440; Macromolecular Rapid Communications 15, No. 5; Huthig & Wepf Verlag, Basel, Germany.

International Search Report and Written Opinion, Apr. 16, 2008 for International Application No. PCT/US2007/081940, pp. 1-18.

* cited by examiner

OLIGOSILOXANE MODIFIED LIQUID CRYSTAL FORMULATIONS AND DEVICES USING SAME

This application relates to the use of oligosiloxane modified liquid crystals and their use in electro-optic devices. The invention specifically relates to the formulation of such liquid crystals to enable their use in bistable, ferroelectric displays which can be isothermally electric field aligned, and which also have very low Spontaneous polarizations (Ps) which are required for practical devices utilizing active matrix backplane technologies.

Thermotropic liquid crystals are materials which are capable of exhibiting liquid crystal, or mesogenic phases, where the phase can change as a function of temperature. The liquid crystalline phases, such as nematic, or smectic, tend to exist between the isotropic and crystalline phases and exhibit physical properties which are not observed for isotropic (liquid) or crystalline phases. For example, a liquid crystal phase can exhibit both birefringent and fluid behaviors at the same temperature. Such properties have been exploited in electro-optic devices such as transmissive and reflective displays, where the birefringence can be effectively tuned by the application of electric fields in a device structure where the orientation of the liquid crystal molecules has been controlled. Nematic liquid crystals have been widely exploited in liquid crystal displays (LCD's), for example in displays for laptop computers, cell phones, PDAs, computer monitors, and TVs. While electro-optic devices based upon nematic liquid crystals have been widely utilized, the fastest response time of such devices is restricted to on the order of a millisecond, because the devices rely on a surface alignment controlled relaxation process for part of the switching cycle. Ferroelectric liquid crystals have the potential to switch between optical states much more rapidly. However, although both digital and analogue mode devices have been developed, such devices have proven to be difficult to deploy and therefore have only been commercialized in specialized, micro display applications such as camera viewfinders.

Clark and Lagerwall (U.S. Pat. No. 4,367,924, and Applied Physics Letters, 36, 899-901, (1980), both of which are incorporated herein by reference) have described devices which utilize organic ferroelectric liquid crystals which exhibit sub-microsecond electro-optic switching speeds. The Clark and Lagerwall devices are so-called Surface Stabilized Ferroelectric Liquid Crystal Devices (SSFLCDs). Such devices utilize organic ferroelectric liquid crystals, or their formulations, which exhibit the chiral smectic C (SmC*) phase that is required for the digital switching SSFLCD mode. The materials typically exhibit the following phase sequence upon cooling in order to facilitate the manufacture of SSFLCDs: Isotropic→Nematic→SmA*→SmC*, where SmA* is the chiral smectic A phase. This phase sequence permits the formation of surface stabilized aligned phases due to the surface registration of the liquid crystalline molecules in the low viscosity nematic, higher temperature phase. The aligned liquid crystal device is then carefully cooled through the SmA* phase and into the SmC* phase to create the SSFLCD. If the SmC* phase can be robustly aligned into the so-called 'bookshelf' geometry, then the devices exhibit bistable ferroelectric switching.

However, this has proved to be difficult in practice. SSFLCDs are susceptible to several problems which have resulted in only limited commercialization of the technology. A key limitation results from the phase sequence employed because conventional, organic FLCs undergo significant layer shrinkage during the transition when cooled from the higher temperature SmA* into the lower temperature SmC* phase. The shrinkage of the layered structures results in the formation of defects (zig-zag defects, due to the formation of buckled layers, or chevrons) which significantly reduce the contrast ratios observed for SSFLCDs. The formation of chevron structures and the control of these structures enable the fabrication of either C1 or C2 type devices, as is well known to those skilled in the art, for example, see *Optical Applications of Liquid Crystals*, Ed. L Vicari, Chapter 1, ISBN 0750308575. In some cases, the ideal so-called "bookshelf geometry," where the layers of the SmC* phase are arranged perpendicular to the device substrates and alignment layers, can be induced in such materials by the application of an electric field. However, devices with induced, or pseudo, bookshelf structures are not practical for commercial display devices due to manufacturing requirements and the potential for the devices to revert to chevron alignment once deployed. Thus, while many SSFLCD patents claim that bookshelf structures are present, it is important to understand whether such structures are true bookshelf structures or pseudo bookshelf structures, and whether chevron structures are present when utilized for devices. These limitations of conventional SSFLCDs are also discussed by Crossland et al. in Ferroelectrics, 312, 3-23 (2004).

This inherent problem for FLC materials with the Isotropic→Nematic SmA*→SmC* phase sequence has led to the investigation of new materials which are not prone to the layer shrinkage phenomenon. One approach to eliminate this is to use so called 'de Vries' materials which exhibit an Isotropic→SmA*→SmC* phase sequence and where there is practically no layer shrinkage at the SmA*→SmC* phase transition. The absence of a very low viscosity nematic phase requires alternative alignment schemes to allow the random domains and natural helielectric state of the SmC* phase to be converted into a phase structure approaching a mono-domain, which is orientated with respect to the electrodes and substrates to yield a practical electro-optic device.

Coles (U.S. Pat. No. 5,498,368 and Proceedings of SPIE, Vol. 2408, 22-29 (1995), both of which are incorporated herein by reference) highlighted the unexpected properties of oligosiloxane-modified ferroelectric liquid crystals based upon phenylbenzoate aromatic cores. True bistability, i.e., the retention of the electrically-selected orientation of the LC mono-domain after the removal of an applied electric field, and the greatly reduced sensitivity of the FLC tilt angle over temperature ranges as wide as 50° C., were demonstrated in this patent. In this case, a mono-domain was created by slowly cooling the device (e.g., 1° C./min) from the isotropic phase and then through the SmC* in the presence of an applied electric field. Crossland et al. (WO 2005019380A1, incorporated herein by reference) later demonstrated devices using simple, single component oligosiloxane FLCs based upon phenyl benzoate aromatic cores which utilized only electric fields for mono-domain alignment, and which were described as being bistable, based upon the definition included in the patent application.

Goodby et al. (U.S. Publication 2005/0001200A1, incorporated herein by reference) described a composition of matter for a class of oligosiloxane liquid crystal containing a biphenyl core. Goodby noted that such materials can be used alone or in an admixture with other liquid crystals, although he did not discuss the design of such mixtures beyond the use of claimed materials which each has a SmA phase to stabilize the SmA phase of the resulting liquid crystal mixture. Based on this and the comparative compound examples within the patent it is apparent that the intent is to design conventional SSFLC mixtures with the Isotropic→Nematic→SmA*→

SmC* phase sequence. The patent discussed only the phase sequences of the materials claimed, with no mention of other critical physical properties which are needed to construct a practical FLCD.

Li et al. (J. Mater. Chem., 17, 2313-2318, (2007), incorporated herein by reference) prepared some achiral siloxane terminated phenylpyrimidines. Some of these materials had an Isotropic→SmC→Crystal phase sequence (mesogens 1a, two further mixtures based upon mesogens 3 and 4 (24 and 26 degrees respectively). Thus, he only reported that he could align mixtures where the chiral additive was added to a mesogen with an Isotropic→SmA→SmC→Crystal phase sequence. The abstract and summary highlight the bone fide de Vries behavior of mesogen 3, which has a terminal chlorine atom and an Isotropic→SmA*→SmC* phase sequence. The structures are shown below.

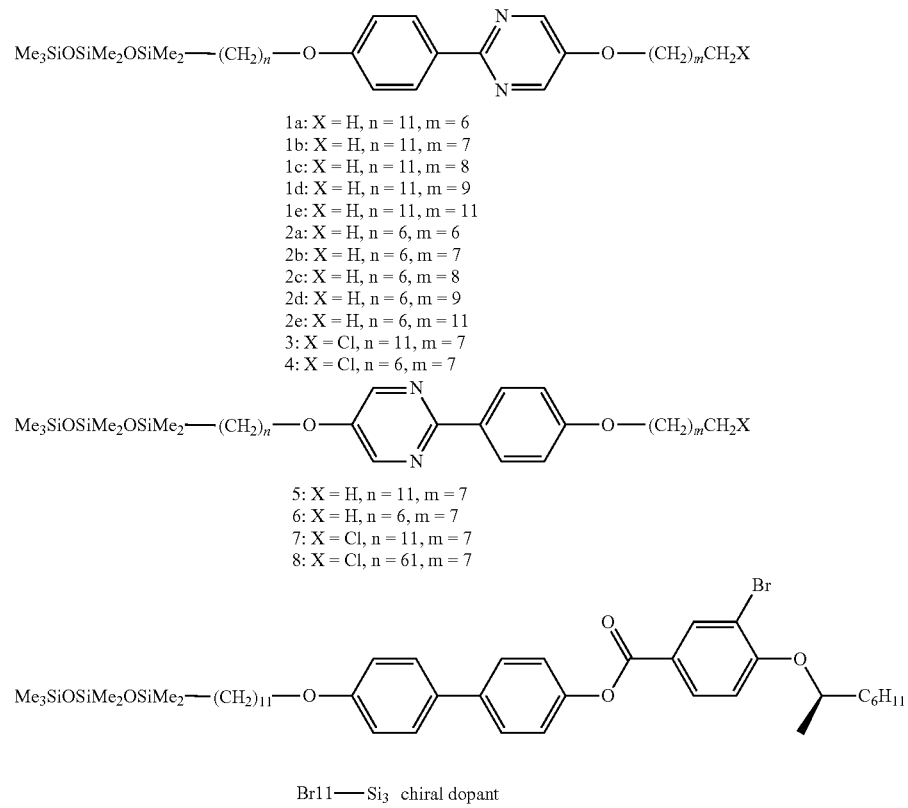

Br11—Si$_3$ chiral dopant 1b, 1c, 1d, 1e, 2e, 5, 6, 7, 8 in the table below), while others had an Isotropic→SmA→SmC→Crystal phase sequence (mesogens 2a, 2b, 2c, 2d, 3, 4 in the table below). He used 1 mole % of a chiral oligosiloxane ("Br11-Si$_3$") as an additive to mesogens 1b, 2b, 3, 4, 5, 6, 7, and 8 in an attempt to measure the optical tilt angle by POM (Polarized Optical Microscopy). He noted that others had observed discrepancies between the X-ray data and POM observations for siloxane-terminated liquid crystals and investigated the relationship between the smectic layer spacing defined by X-ray and the optical tilt angle of selected mesogens. The phase sequences of the binary mixtures formed are not reported. He reported that five mixtures (based upon 1b, 5, 6, 7, and 8, all of which have an Isotropic→SmC phase sequence) were prepared but could not be aligned into a mono-domain, and that he could not measure a tilt angle. He noted the alignment materials and the cell gap used, but did not discuss the process used to attempt to create alignment within the test cell. He noted that he was able to align one sample, based on mesogen 2b, and a tilt angle of 36 degrees was measured. This tilt angle is not useful for a practical FLCD, where tilt angles close to 22.5 degrees or 45 degrees are a prerequisite depending on the operational mode of the FLC device. He noted that samples must be aligned to measure the tilt angle and reported tilt angles for Walba et al. (U.S. Pat. No. 6,870,163, incorporated herein by reference) noted that it is well known to those skilled in the art of FLC materials and devices that a typical FLC device does not exhibit true optical bistability due to chevron defect formation. Crossland et al., in Ferroelectrics, 312, 3-23 (2004) (incorporated herein by reference), discuss the impact of this limitation on device operation, for example, the need for DC balancing and inverse framing, leading to 'dead periods' during imaging. U.S. Pat. No. 6,507,330 (Handschy et al.) also discussed the need for DC balancing.

In WO2005/019380A1 (incorporated herein by reference), Crossland et al. noted the unique properties of oligosiloxane FLCs and devices, including electric field alignment, insensitivity of the tilt angle to temperature within the SmC* phase, and true bistability, combined with the ability to rotate the aligned smectic mono-domain with respect to rubbing direction of the alignment layers within the device. However, such features were only demonstrated for single component, phenylbenzoate based oligosiloxane mesogens. It was noted that the tilt angle can only be tuned by changing the molecular structure of the component, i.e., all the required properties must be designed into a single molecular structure.

Those skilled in the LC art know that molecules are usually formulated to provide mixtures with broad operating ranges and to tune the many physical properties which must be optimized to meet the requirements of a practical FLC device. The vast majority of this formulation knowledge has been developed using organic FLCs which have been developed for use in the conventional mode, chevron devices which also utilize materials with the Isotropic→Nematic→SmA*→SmC* phase sequence.

Oligosiloxane modified liquid crystals are differentiated from conventional liquid crystals due to their propensity to form nano-phase segregated layered structures, as described by Coles et al. (Liquid Crystals, 23(2), 235-239, (1997); J. Phys II France, 6, 271-279, (1996)) and Li et al. (J. Mater. Chem., 17, 2313-2318, (2007) and references cited therein, all of which are incorporated herein by reference). Such systems have been described as "virtual polymers" because their structures and properties combine some of the features of Side Chain Liquid Crystal Polymers (SCLCP) and some of the properties of conventional organic liquid crystals. The structure and properties of oligosiloxane modified liquid crystals differ so significantly from organic liquid crystals that they have been classified as a type of amphiphilic, or nano-phase segregated, liquid crystal in a recent scientific review article. (see C. Tschierske, 'Non-conventional liquid crystals—the importance of micro-segregation for self-organization', J. Mater. Chem., 1998, 8(7), 1485-1508). The structures of such systems are still an area of active scientific debate, see Li et al. (J. Mater. Chem., 17, 2313-2318, (2007), all of which are incorporated herein by reference).

The formulation of oligosiloxane-modified, nano-segregated ferroelectric liquid crystals for use in practical devices, for example, including but not restricted to, active matrix Ferroelectric LCDs (FLCDs), has not been studied in detail. The formulation of organic liquid crystals has been extensively studied, and many predictive rules have been developed to aid the design of the liquid crystal phase behavior of such formulations (Demus et al., Mol. Cryst. Liq. Cryst., 25, 215-232, (1974); Hsu et al., Mol. Cryst. Liq. Cryst., 27, 95-104, (1974); Rabinovich et al., Ferroelectrics, 121, 335-342, (1991)). However, in our experience, such formulation design approaches are not suitable for oligosiloxane FLCs because even standard "rules of thumb" that the phase of an unknown liquid crystal can be identified if it is miscible with a liquid crystal with a known phase (Goodby & Gray, in *Physical Properties of Liquid Crystals*, ISBN 3-527-29747-2, page 17), i.e., "like liquid crystals" are miscible with "like liquid crystals," break down. Such basic rules do not apply to oligosiloxane modified ferroelectric liquid crystals where the nano-phase segregated smectic layering dominates and other classes of liquid crystal, or even non-liquid crystal molecules, are readily admixed without the loss of the smectic phase structure. For example, Coles and Li have independently demonstrated unexpected examples of miscibility in such systems, highlighting the difference of oligosiloxane systems from organic LC systems (see Coles et al., Ferroelectrics, 243, 75-85, (2000) and Li et al., Advanced Materials 17(5), 567-571, (2005), both of which are incorporated herein by reference). Prior to the present invention, well-defined predictive rules for the formulation of compositions containing high levels of oligosiloxane liquid crystals have not been identified, nor has the ability to tune physical property sets to meet practical device materials, alignment and robustness requirements been demonstrated. For example, the attempt of Li et al. (J. Mater. Chem., 17, 2313-2318, (2007)) to study the tilt angle of a simple series of materials was frustrated because only three of the eight mixtures prepared could even be aligned to allow the tilt angle to be determined.

Canon (U.S. Pat. No. 5,720,898, incorporated herein by reference), describes a class of device containing a main chain type liquid crystal containing a siloxane linking group, and a liquid crystalline monomer. In U.S. Pat. No. 5,720,898, the smallest main chain polymer can be an ABA species, where A=a mesogenic group and B=a disiloxane linkage. This patent teaches that the smectic ABA material is added as a minor component to a monomeric, organic mesogen and there is no suggestion that the liquid crystal phase is nano-phase segregated. In fact, the siloxane additive does not perturb the conventional smectic phase structure. The inventors noted that the phase can be stabilized provided the covalently bonded ABA oligomer is able to span adjacent layers of the smectic phase. The liquid crystal system is macroscopically aligned by stretching or shearing of the LC medium within the device. In this example, the layer structure is not nano-phase segregated because it is based on monomeric, organic mesogens, and the ABA oligosiloxane is added at low concentration to span the existing layers, thus pinning them together and stabilizing the phase. The patent teaches that if the siloxane linking segment is too large, the molecule may fold into a hairpin and no longer span the adjacent layers, and thus the pinning mechanism is lost.

Therefore, there is a need for formulations of oligosiloxane liquid crystal materials which can be used in bistable, ferroelectric displays.

The present invention meets that need by providing a nano-phase segregated oligosiloxane modified liquid crystal formulation with a balanced property set for application in practical devices. The liquid crystal formulation comprises a first oligosiloxane-modified nano-phase segregating liquid crystalline material; and at least one additional material selected from a second oligosiloxane-modified nano-phase segregating liquid crystalline material, non-liquid crystalline oligosiloxane-modified materials, organic liquid crystalline materials, or organic non-liquid crystalline materials, wherein the liquid crystal formulation is nano-phase segregated in the SmC* phase, has an I→SmC* phase transition, with a SmC* temperature range from about 15° C. to about 35° C., has a tilt angle of about 22.5°±6° or about 45°±6°, and has a spontaneous polarization of less than about 50 nC/cm$^2$, and a rotational viscosity of less than about 600 cP.

Another aspect of the invention is a device containing a liquid crystal formulation. The device has a stable bookshelf geometry, bistable switching, and isothermal electric field alignment, a response time of less than 500 μs when switched between two stable states, and an electric drive field of less than about 30 V/μm.

Figure 1:
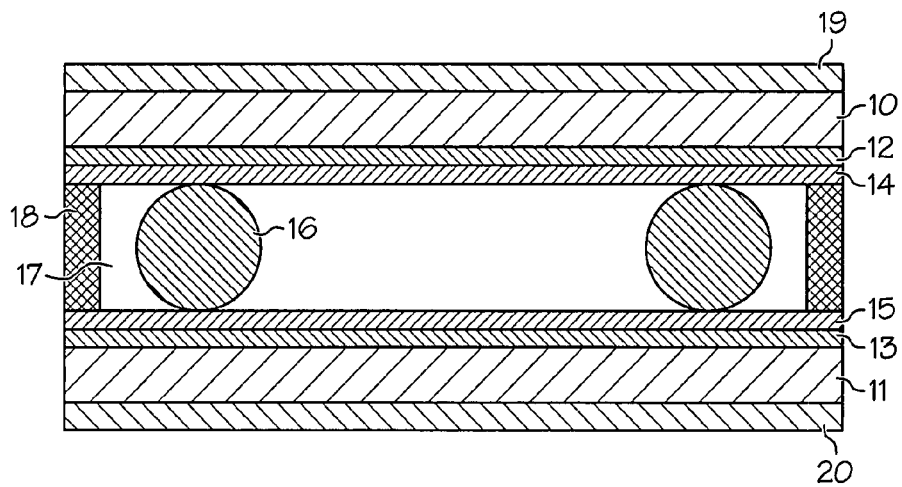
FIG. 1 shows a cross-section of a typical bistable liquid crystal cell.

We have determined that the behaviors of formulated oligosiloxane-modified liquid crystals are fundamentally different from the majority of conventional liquid crystals due to the nano-segregation. Furthermore, we have shown distinct features stemming from the presence of the resultant siloxane rich region in the layers. For example, the oligosiloxane modification has been found to promote the formation of the smectic phase due to nano-segregation. In addition, because of the impact of nano-segregated smectic layering, other classes of liquid crystals and non-liquid crystal molecules are readily admixed without the loss of the smectic phase structure. These are important features because of the challenge in achieving necessary property sets in a single molecule. Therefore, property optimization by mixing of various components is an important approach in realizing practical liquid crystal materials. The stabilized smectic phase found in a distinct class of liquid crystals, represented herein by the nano-segregating oligosiloxane-modified liquid crystals, is an important feature in the present invention where applications focused formulation is employed to realize a practical composition with a well balanced property set, while retaining the chiral smectic phase structure necessary for ferroelectric liquid crystal properties. This approach helps to achieve practical FLC devices. Prior to the present invention, well-defined predictive rules for the formulation of compositions containing high levels of oligosiloxane liquid crystals, demonstrating the ability to tune physical property sets to meet practical device materials, have not been demonstrated. The present invention shows the benefit of the use of oligosiloxane-modified liquid crystal as a base liquid crystal composition to formulate a stable ferroelectric liquid crystal composition with a balanced property set that can be utilized to realize practical devices based on Si-TFT technology. Furthermore tailored device structures and practical alignment schemes have been developed for these oligosiloxane-modified liquid crystal formulations, which eliminates significant fabrication and alignment stability issues for conventional Isotropic→Nematic→SmA*→SmC* organic ferroelectric liquid crystals, which are known to those skilled in the art.

The present invention will demonstrate how to develop the basic materials and device properties required for practical devices within nano-phase segregated, oligosiloxane FLC systems successfully. Formulations having an Isotropic→SmC* phase sequence and the novel ferroelectric devices that they enable are the subject of the present patent application. Although wholly organic mesogens may be formulated with this phase sequence, the present application relates to oligosiloxane FLCs. These low molecular mass liquid crystals are hybrid siloxane-organic moieties, where a discreet siloxane segment is grafted onto an organic moiety, or moieties, in an AB or ABA fashion, where B=oligosiloxane and A=organic. The siloxane is oligomeric and is thus differentiated from Side-Chain Liquid Crystal Polysiloxanes (SCLCP), Main-Chain Liquid Crystal Polysiloxanes (MCLCP), or Liquid Crystal polysiloxane Elastomers (LCE) in both structure and physical properties. Oligosiloxane LCs are of interest because they combine stable smectic phases with the high degree of mobility required for the operation of practical LCDs.

The present invention relates to the design of optimized ferroelectric liquid crystal formulations which contain at least one oligosiloxane-modified liquid crystalline material. The oligosiloxane-modified liquid crystalline material may be blended with other oligosiloxane-modified liquid crystals, organic liquid crystals, non-liquid crystalline hybrid oligosiloxane organic materials, or non-liquid crystalline organic materials to create formulations with optimized liquid crystalline properties. The formulations may be used to prepare FLC devices which are electric field aligned and exhibit true bistability. These features enable digital addressing schemes without the need to use inverse frames for the purposes of DC-balancing, coupled with the ability to align, or re-align, the device isothermally, at any time, using electric fields. The latter property overcomes the short-comings of Isotropic→Nematic→SmA*→SmC* phase sequence materials, where the requirement for slow cooling makes it difficult to re-align a device that has damaged alignment caused by mechanical shock or temperature excursions once it has been deployed. Optionally, the formulations which are the subject of this application may exhibit phases below the SmC* phase (i.e., at lower temperature) where the electric field aligned texture is retained and truly bistable switching is observed upon heating back into the SmC* without any significant impact on the operation of the device, for example, a reduction of the contrast ratio of the device. The properties of devices fabricated using the claimed formulations and device fabrication methods utilized result from the unique nano-phase segregated structures of the oligosiloxane-modified liquid crystals which form the base of the formulations. The oligosiloxane-modified liquid crystalline component(s) should always be present in sufficient concentration to induce a nano-phase segregated SmC* phase, for example, as detected by X-Ray Diffraction studies.

The formulation includes at least two components. There can one or more oligosiloxane-modified liquid crystalline components in the formulation. In addition, there can be one or more non-liquid crystalline oligosiloxane-modified materials, organic liquid crystalline materials, or organic non-liquid crystalline materials in the formulation. The components which are not oligosiloxane-modified liquid crystalline components (if any) are generally present in an amount of less than about 50 mol %, or less than about 45 mol %, or less than about 40 mol %, or less than about 35 mol %, or less than about 30 mol %.

These formulations are designed for use in a range of devices which utilize amplitude or phase modulation of light including, but not limited to, transmissive displays, spatial light modulators, and reflective mode microdisplays. Such devices may utilize passive matrix style addressing or active pixel addressing with thin film transistors (TFT) backplanes, for example, devices such as Passive Matrix Liquid Crystal Devices (PMLCD), or Active Matrix Liquid Crystal Devices (AMLCD). In this application, we will focus upon the case of AMCLD devices, which can operate in transmissive or reflective modes. However, the formulations are not intended to be limited to use with such a device; they could be used with other types of devices, which are well known to those of skill in the art. The use of TFTs to control liquid crystal orientation, whether based upon amorphous silicon (a-Si), Low Temperature Polycrystalline Silicon (LTPS), or crystalline Silicon, imposes constraints on the magnitude of the spontaneous polarization (Ps) of the liquid crystal formulation which can be tolerated due to charge transport limitations of the TFT. A low Ps value considerably simplifies the design of the TFT-based Active Matrix. Those skilled in the art will be aware that a high Ps results in reduced degrees of freedom within display design, for example, lower resolution, smaller display size and potentially reduced aperture sizes, and ultimately preclude the use of Si-TFT. Simplified backplane circuitry enables larger aperture ratios (i.e., brighter displays) and lower cost.

The formulations of the present invention are specifically designed to have low spontaneous polarization (Ps values) to enable them to be used in active matrix backplane electro-optic devices. If the Ps value is too high, then the current flow produced during the electric field induced re-orientation of the mesogens from one optical state to the other exceeds the plausible design space for the pixel circuitry's current driving capacity. As is well known to those skilled in the art, the Ps can be either positive or negative. When values are given in this application, the number is intended to mean both the positive and the negative value. For example, a Ps of 10 nC/cm² means either +10 nC/cm² or −10 nC/cm².

The electro-optic response time of a ferroelectric liquid crystal may be determined by the following equation:

$$\tau \propto \eta / Ps \cdot E$$

where
$\tau$=the time required for the optical response to change from 10% to 90%.
E=the applied electric field which drives the change in the optical states
Ps=the spontaneous polarization
$\eta$=the rotational viscosity.

In practice, the response time should be as fast as possible, and preferably < about 500 microseconds, or < about 250 microseconds, or < about 100 microseconds, or < about 75 microseconds or < about 50 microseconds. The magnitude of the Ps of the formulation is limited by the backplane (for example, < about 50 nC/cm², or < about 40 nC/cm², or < about 30 nC/cm², or < about 20 nC/cm²), and the electric field necessary for switching should be as low as possible (for example, < about 30 V/μm, or < about 20 V/μm, or < about 15 V/μm, or < about 10 V/μm, or < about 5 V/μm). In addition to developing FLC formulations with Isotropic→SmC* phase sequences on cooling, there is a need to minimize the rotational viscosities to optimize the electro-optic response times for the low Ps systems (for example, < about 600 cP, or < about 400 cP, or < about 300 cP, or < about 200 cP, or < about 100 cP, or < about 50 cP).

Previous applications (for example, the Crossland (WO 2005/019380) and Dow Corning (US2007/009035) applications) highlighted single component ferroelectric liquid crystals. However, the single component materials were not optimized for AMLCD. In practice, it is very difficult to design a single molecule which exhibits all the attributes required for use in AMLCD. The present invention provides methods to optimize these attributes via a formulation approach, which are more suited for use in AMLCD.

For example, in the case of a practical transmissive AMLCD, the careful design of formulations based upon oligosiloxane-modified liquid crystalline material(s) and the custom design of a suitable design primitive enable the formulations to demonstrate a number of desirable features. By "design primitive" we mean the integration of a liquid crystal formulation with suitable substrates, alignment layer technology, electrode structures, and polarizer technologies that are required to fabricate a basic FLC electro-optic device. Such devices are differentiated from existing ferroelectric liquid crystals devices by a combination of the composition of the formulation, the liquid crystal phase sequences, and the alignment properties. Favorable features for both AMCLD and PMLCD include:

1) A wide SmC* phase and, therefore, wide FLC operating temperature range, spanning ambient temperature. By wide we mean at least spanning about 15° C. to about 35° C. and preferably about 10° C. to about 40° C., or about 0° C. to about 50° C., or about −20° C. to about 60° C., or about −30° C. to about 80° C.

2) An alignment process which allows the formation of a liquid crystalline mono-domain, or near mono-domain, with a bookshelf geometry within the design primitive. The alignment process can be undertaken within the SmC* phase of formulated, nano-phase segregated, Isotropic→SmC* systems, isothermally using suitable electric fields. This differs from the FLCD prior art, where specific overlying liquid crystal phases (specifically SmA* and Nematic) and a carefully controlled cooling profile through the Isotropic→Nematic→Smectic A* and eventually into the SmC* phase is essential. The ability to align the SmC* phase isothermally is advantageous, simplifying device fabrication and allowing alignment to be achieved without the need to design complex phase sequences in the formulation. The ability to use isothermal, electric field alignment in the SmC* phase enables the device to be re-aligned at will during deployment, which is of great significance, as those skilled in the art will know that current ferroelectric liquid crystal devices may irreversibly lose alignment due to mechanical shock or temperature excursions where the liquid crystal becomes crystalline or isotropic.

3) The resulting bookshelf structure should be stable during the operation and storage of the device. In cases where some degradation is observed, then the isothermal, electric alignment scheme employed for oligosiloxane ferroelectric liquid crystal formulations can be used to repair the alignment. Many conventional, all organic FLCs have claimed bookshelf, or pseudo bookshelf geometries, but these structures are not stable enough for deployment in devices. The bookshelf structures claimed here have enhanced integral stability within the design primitive. We have discovered that the enabling effect of the nano-phase segregated oligosiloxane-modified liquid crystalline molecules, as described for single component systems by Coles, Crossland, and Dow Corning, can be retained in suitably formulated systems. The nano-phase segregated bookshelf structure of a dual segment host stabilizes the structure. The pinning mechanism described by Canon is not required in nano-phase segregated oligosiloxane liquid crystal systems, and we have demonstrated the ability to achieve true bistability in systems which do not contain ABA (i.e., bi-mesogenic) species. Thus, the tri-segment (ABA) molecules used by Canon are not required for the stabilization of the formulations described here. However, tri-segment molecules may be used in the broadening of the SmC* temperature range in the present invention, if desired. Formulations are also designed to eliminate the formation of chevron defects by eliminating an overlying Smectic A phase, resulting in formulations with a direct I→SmC* phase transition. A potential failure mode of conventional organic FLCDs is the loss of alignment if the FLC material is allowed to crystallize at low temperature, for example during storage or shipping. We have demonstrated that formulations can be developed which do not crystallize. These formulations have a wide SmX phase below the SmC* phase. The SmX phase is defined as a non-crystalline phase in which electro-optic switching ceases under the conditions defined herein, but in which the macroscopic molecular alignment of the bookshelf structure is retained at low temperature. Although the device is not operational in this phase, it becomes operational again when allowed to return to the operational temperature range.

4) The alignment quality and uniformity should be sufficient to enable the realization of high contrast ratios and bistability over the entire active area of a device. By high contrast, we mean equivalent or superior to commercial organic Isotropic→Nematic→Smectic A*→SmC* phase sequence formulations tested under equivalent conditions.

5) The tilt angle should be tuned to a specific value for the efficient operation of polarizer based electro-optic devices. For example, in the case of transmissive devices the optimum tilt angle is 22.5 degrees, ±6 degrees, or 22.5 degrees, ±4 degrees, or 22.5 degrees, ±2 degrees. Furthermore, the tilt angle should not change too dramatically within the operational temperature range of the device. The ability to design formulations with a range of tilt angles is also advantageous; for example, formulations with a tilt angle of 45 degrees, ±6 degrees, or 45 degrees, ±4 degrees, or 45 degrees, ±2 degrees, can also be used for phase modulating devices.

6) The need for a low Ps has been noted above. Although a low Ps is a requirement of the TFT-based Active Matrix backplane technologies as currently exploited in commercial LCDs, this imposes a significant challenge for devices whose alignment is undertaken in a viscous smectic phase at, or near, ambient temperature using electric field alignment protocols. In addition to the alignment process, lower Ps can negatively impact response time of the liquid crystal device at fixed temperature and driving field.

7) For digital mode devices, true bistability is a requirement. By "true bistability", we mean the retention of the optical signal, within a specific tolerance, for some time after the removal of the switching field. An example of tolerance is that the optical signal should not degrade by more than about 20%, or by more than 10%, or by more than 5%. A short term relaxation to a plateau value may be acceptable, but a continuous decline in optical transmission is not acceptable. The acceptable time is dictated by the application and by the drive architecture, and can range from minutes to milliseconds.

8) The birefringence of the formulation should be optimized based upon the design primitive, i.e., the AMLCD design. The birefringence is typically greater than about 0.05, or greater than about 0.1. The birefringence should not vary widely over the operational temperature range, for example the variation in birefringence of < about 100 ppm/° C., or < about 50 ppm/° C. between the lower end of the operational temperature range and about 5° C. below the SmC*→Isotropic phase transition.

Practical FLC devices can be developed if formulations are designed which operate within the constraints defined above. As noted previously, while a considerable body of formulation experience exists for organic FLC systems based upon organic materials, such information cannot be directly transferred to the present oligosiloxane-based FLC formulations because of the combined impact of the following: i) the increased structural complexity of the nano-phase segregated structure exhibited by the oligosiloxane based systems covered herein; ii) the utilization of a specific phase sequence for the vast majority of organic FLCs, i.e., Isotropic→Nematic→SmA*→SmC* for organic systems; iii) the ability to observe reduced temperature dependence of Ps and tilt angle in oligosiloxane-based formulations; iv) the electric field alignment and layer rotation features of oligosiloxane-based formulations; v) the true bistability of oligosiloxane-based formulations; vi) the ability to tune tilt angle in nano-phase segregated systems; vii) the ability to design sub-SmC* phase properties which can avoid the disruption of the preferred molecular alignment at low temperatures; and viii) the ability to suppress nematic phase formation in oligosiloxane-modified ferroelectric liquid crystal formulations, for example, when 4-n-pentyl-4'-cyanobiphenyl (compound 9) or Felix 15/000 ('compound' 15) are added to smectic oligosiloxane systems.

One approach is to design formulations with an Isotropic→SmC*→Crystal or preferably an Isotropic→SmC*→SmX phase sequence. We have discovered that materials with a wide range of phase behaviors can be used to develop formulations with the above phase sequences. Materials with phase sequences selected from, but not limited to, the following types can be used in formulation: i) Isotropic→SmC*; ii) Isotropic→SmA; iii) Isotropic→SmA→SmC; iv) Isotropic→SmA*→SmC*; v) Isotropic→Nematic; vi) monotropic liquid crystalline phases; vii) non liquid crystalline materials; etc. Not all of the materials used for formulation need to be oligosiloxane functionalized, provided there is sufficient oligosiloxane modified material present to preserve the nano-phase segregated structure in the formulation.

In one embodiment of the invention, the properties of an I→SmC* phase sequence oligosiloxane liquid crystal are tuned in the following manner.

1) The aromatic core is selected to reduce inter-molecular interactions, thus lowering the rotational viscosity of the final formulation.

2) The hydrocarbon chain separating the aromatic core from the siloxane is selected to provide optimum decoupling from the oligosiloxane, while providing a low regime (about 22.5 degrees) or high regime (about 45 degree) tilt angle.

3) The oligosiloxane is selected to be as short as possible to obtain the maximum possible birefringence, while maintaining the required phase properties.

4) A smectic A material can be added to reduce the effective tilt angle of the formulation, without inducing a SmA phase in the formulation.

5) Several approaches can be taken to achieve a low overall Ps value. For examples, a mesogenic species of intrinsically low Ps can be made, achiral and chiral species can be formulated to set a Ps, or materials with opposing optical activity can be formulated to tune Ps.

Our investigations have shown that the selection and optimization of such formulations involves balancing the effects of different components. For example, an additive which is effective at reducing the tilt angle may not be as effective in reducing the rotational viscosity, or it may hinder the alignment of the sample.

Oligosiloxane-modified nano-phase segregating liquid crystalline materials used in the preparation of suitable formulations include, but are not limited to, the structures given below. Note that the oligosiloxane-modified nano-phase segregating liquid crystalline materials can be defined as AB (two segment adduct) or ABA (three segment adduct, also known as an LC dimer), where B=the siloxane segment and A=the aromatic liquid crystal core. ABA' structures are also given, where A and A' are non equivalent groups, leading to asymmetric structures.

I) Components which can be Use to Create the Nano-Phase Segregated Smectic Phase (Generic Structures)

Among the oligosiloxane-modified liquid crystalline materials which can be used to create the nano-phase segregated smectic phase in the formulation are phenylbenzoates and biphenyls, terphenyls, and phenylpyrimidines. Examples of suitable materials are shown below.

1) Phenylbenzoates and Biphenyls

One class of compounds has the formula:

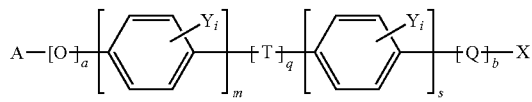

where a=0 or 1; m=1 or 2; s=1 or 2; q=0 or 1; b=0 or 1; i=0-4; T=O, COO, OCO, CH=N, N=CH, CF$_2$O, OCF$_2$, NHCO, CONH, CH$_2$, CH$_2$CH$_2$, C≡C., —CH=CH— or CF$_2$CF$_2$; Y is independently selected from halogen, NO$_2$, CN, CH$_3$, CF$_3$, OCF$_3$; Q=O, COO, or OCO; and X=an alkyl; or a substituted alkyl with at least one chiral centre, where individual chiral groups can be racemic or non-racemic, provided that the individual chiral groups are selected so that the liquid crystal formulation is non-racemic;

where, A is

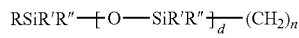

where n=3-15; d=1-5; R', and R" are independently selected from C$_r$H$_{(2r+1)}$, and r=1 to 4, or a phenyl group;
R is an alkyl group having from 1 to 10 carbon atoms or the group W,
where W is

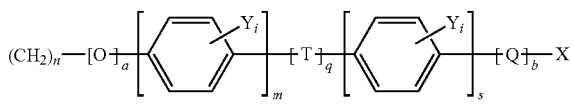

where n=3-15; a=0 or 1; m=1 or 2; s=1 or 2; q=0 or 1; b=0 or 1; i=0-4; T=O, COO, OCO, CH=N, N=CH, CF$_2$O, OCF$_2$, NHCO, CONH, CH$_2$, CH$_2$CH$_2$, C≡C, —CH=CH—, or CF$_2$CF$_2$; Y is independently selected from halogen, NO$_2$, CN, CH$_3$, CF$_3$, OCF$_3$; Q=O, COO, or OCO; and X=an alkyl; or a substituted alkyl with at least one chiral centre, where individual chiral groups can be racemic or non-racemic, provided that the individual chiral groups are selected so that the liquid crystal formulation is non-racemic.

The alkyl and substituted alkyl groups represented by X typically have from 2 to 20 carbon atoms. The substituted alkyls can be substituted with one or more of the following groups: further alkyl groups, halogens, epoxides, NO$_2$, CN, CF$_3$, or OCF$_3$.

2) Terphenyls

Another class of suitable compounds is terphenyls having the formula:

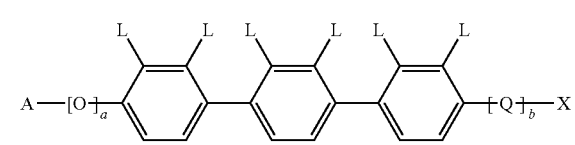

where a=0 or 1; b=0 or 1; L is independently selected from H, halogen, NO$_2$, CN, CH$_3$, CF$_3$, OCF$_3$; Q=O, COO, or OCO; and X=an alkyl; or a substituted alkyl with at least one chiral centre, where individual chiral groups can be racemic or non-racemic, provided that the individual chiral groups are selected so that the liquid crystal formulation is non-racemic;
where A is

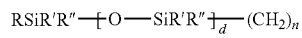

where n=3-15; d=1 to 5; R' and R" are independently selected from C$_r$H$_{(2r+1)}$ and r=1 to 4, or a phenyl group;
where R is an alkyl group having from 1 to 10 carbon atoms, or one of W" or W, as defined elsewhere, or W',
where W' is

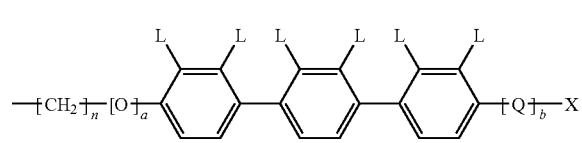

where n=3-15; a=0 or 1; b=0 or 1; L=is independently selected from H, halogen, NO$_2$, CN, CH$_3$, CF$_3$, OCF$_3$; Q=O, COO, or OCO; and X=an alkyl; or a substituted alkyl with at least one chiral centre, where individual chiral groups can be racemic or non-racemic, provided that the individual chiral groups are selected so that the liquid crystal formulation is non-racemic.

The alkyl and substituted alkyl groups represented by X typically have from 2 to 20 carbon atoms. The substituted alkyls can be substituted with one or more of the following groups: further alkyl groups, halogens, epoxides, NO$_2$, CN, CF$_3$, or OCF$_3$.

3) Phenyl Pyrimidines

Other classes of suitable compounds are phenyl (or biphenyl)pyrimidines having the formulas:

Type 1

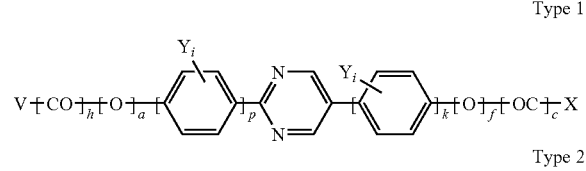

Type 2

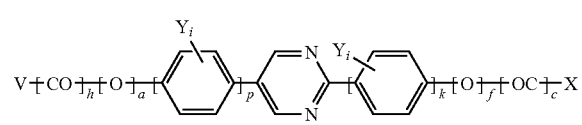

where a=0 or 1, p=0, 1 or 2, k=0, 1 or 2, f=0 or 1; h=0 or 1; c=0 or 1; i=0-4; with the proviso that if f=0, c=0; with the proviso that if a=0, h=0; Y is a halogen, $NO_2$, CN, $CH_3$, $CF_3$, or $OCF_3$; where X=an alkyl; or a substituted alkyl with at least one chiral centre, where individual chiral groups can be racemic or non-racemic, provided that the individual chiral groups are selected so that the liquid crystal formulation is non-racemic; where V is

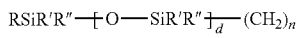

where n=3-15; d=1-5; and R' and R" are independently selected from $C_rH_{(2r+1)}$ and r=1-4, or a phenyl group;
where R is an alkyl group having from 1 to 10 carbon atoms, or W, or W', as defined elsewhere, or W'",
where W'" is selected from one of the following groups to create a symmetrical or asymmetrical dimeric additive:

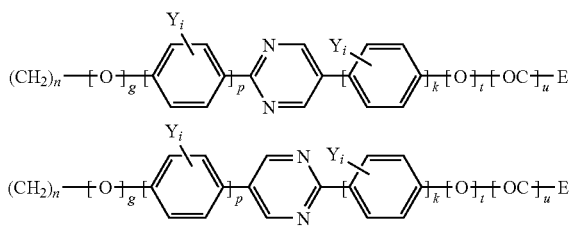

where n=3-15; g is 0 or 1; p is 0, 1 or 2; k is 0, 1 or 2; i=0-4; t is 0 or 1; u=0 or 1; with the proviso that when t=0, u=0; Y is independently selected from halogen, $NO_2$, CN, $CH_3$, $CF_3$, or $OCF_3$; E is an alkyl; or a substituted alkyl with at least one chiral centre, where individual chiral groups can be racemic or non-racemic, provided that the individual chiral groups are selected so that the liquid crystal formulation is non-racemic.

The alkyl and substituted alkyl groups represented by X and E typically have from 2 to 20 carbon atoms. The substituted alkyls can be substituted with one or more of the following groups: further alkyl groups, halogens, epoxides, $NO_2$, CN, $CF_3$, or $OCF_3$.

II) Components which can be Use to Tune the Properties of the Nano-Phase Segregated Smectic Phase (Generic Structures)

The following classes of materials are useful as additives to formulations containing the oligosiloxane-modified nano-phase segregating liquid crystalline materials given above.

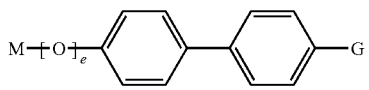

where e=0 or 1; G is H, a halogen, an epoxide, $NO_2$, CN, $CH_3$, $CF_3$, or $OCF_3$; M is an alkyl; or a substituted alkyl with at least one chiral centre, where individual chiral groups can be racemic or non-racemic, provided that the individual chiral groups are selected so that the liquid crystal formulation is non-racemic; or the group

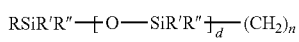

where n=3-15; d=1-5; and R' and R" are independently selected from $C_rH_{(2r+1)}$ and r=1-4, or a phenyl group;
R is an alkyl group having from 1 to 10 carbon atoms, or Z, where Z is

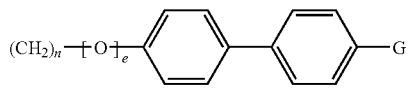

where n=3-15; e=0 or 1; G is H, a halogen, an epoxide, $NO_2$, CN, $CH_3$, $CF_3$, or $OCF_3$.

The alkyl and substituted alkyl groups represented by M typically have from 2 to 20 carbon atoms. The substituted alkyls can be substituted with one or more of the following groups: further alkyl groups, halogens, epoxides, $NO_2$, CN, $CF_3$, or $OCF_3$.

The following classes of materials may also be used as additives.

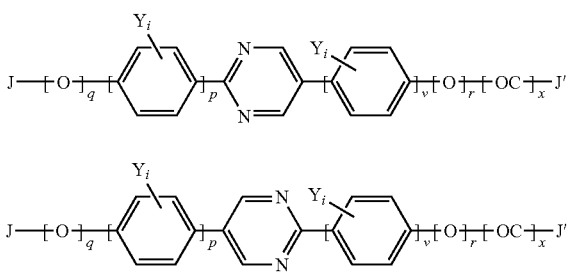

where r=0 or 1; p=0, 1 or 2; v=0, 1, or 2; x can be 0 or 1, q=0 or 1; i=0-4; with the proviso that when r=0, x=0; Y is independently selected from halogen, $NO_2$, CN, $CH_3$, $CF_3$, or $OCF_3$; J and J' are independently selected from an alkyl; or a substituted alkyl with at least one chiral centre, where individual chiral groups can be racemic or non-racemic, provided that the individual chiral groups are selected to ensure that the liquid crystal formulation is non-racemic.

The alkyl and substituted alkyl groups represented by J and J' typically have from 2 to 20 carbon atoms. The substituted alkyls can be substituted with one or more of the following groups: further alkyl groups, halogens, epoxides, $NO_2$, CN, $CF_3$, or $OCF_3$.

If the oligosiloxane-modified nano-phase segregating liquid crystalline components are achiral, then organic chiral molecules can also be used to induce chirality in the liquid crystal formulation.

Examples of Formulations

Liquid crystals molecules (mesogens) are routinely formulated into complex mixtures. Such formulations enable property sets to be realized which would be difficult, or even impossible, to realize from a single molecule. The Crossland (WO 2005/019380) and Dow Corning patent applications (US 2007/009035) identified single component systems which exhibited electric field alignment and bistable switching; however, such molecules require formulation if they are to be used in wide temperature and active matrix backplane devices. The development of formulated systems based upon oligosiloxane-modified liquid crystals is complicated by the unusual micro-phase segregated nature of such materials. The examples given below illustrate how the phase sequence, temperature range of the SmC* phase, spontaneous polarization (Ps), and tilt angle may be controlled in such systems. The formulation of such materials can not be extrapolated from examples of organic FLCs, because the nano-phase segregated oligosiloxane region, which is absent in organic FLC systems, plays an important role in controlling the properties of the bulk formulation, and the electro-optic properties of devices fabricated from them.

The chemical structures of the components used in the different formulations are shown in Table 1. The formulations and their properties are shown in Tables 2-8. Table 2 shows the phase behavior of cyanobiphenyl based materials used for tilt angle tuning. Table 3 shows data for examples of binary formulations based upon an oligosiloxane-modified terphenyl mesogen and organic cyanobiphenyl mesogens. Table 4 shows examples of binary, ternary and quaternary formulations based upon an oligosiloxane-modified terphenyl mesogen and an oligosiloxane-modified cyanobiphenyl mesogen. Table 5 shows examples of formulations containing multiple oligosiloxane-modified terphenyl mesogens. Table 6 shows examples of formulations containing an oligosiloxane-modified phenylpyrimidine and a chiral oligosiloxane phenylpyrimidine dopant. Table 7 shows examples of formulations containing an oligosiloxane-modified phenylpyrimidines and various chiral oligosiloxane modified dopants. Table 7 shows examples of ternary formulations containing an oligosiloxane-modified phenylpyrimidines and a chiral oligosiloxane phenylpyrimidine dopant. Table 8 shows examples of miscellaneous formulations.

Formulations were prepared by weighing components into a vessel and then heating the vessel to a temperature about 10° C. above the clearing temperature (liquid crystal to isotropic transition), or melting point in the case of a non liquid crystalline component, of the component with the highest transition temperature for the formation of an isotropic phase. Samples were held and mixed at this temperature for about 5-10 minutes, and were then allowed to cool down to ambient temperature. All compositions are listed as the mole percentage of each component unless otherwise stated. Formulations were initially characterized using a Differential Scanning Calorimeter (DSC). The temperature range of the DSC experiment was typically −40° C. to 120° C., unless the clearing phase transition temperature of the formulation was >100° C., in which case the upper temperature was increased. Fresh samples were heated into the isotropic phase (Heating run #1), then cooled to −40° C. (Cooling run #1), then heated back into the isotropic phase (Heating run #2) then cooled back to −40° C. (Cooling run #2), then heated back into the isotropic phase (Heating run #3), then cooled back to room temperature (Cooling run #3). Heating runs #2 and #3 were used to define the phase transition temperatures, by selecting the peak temperature for each transition. Thermo-optic analysis using a polarizing optical microscope and a programmable hot stage system was undertaken in order to classify the type of liquid crystal phase present. The current reversal method as described by Miyasato et al., Japan Journal Applied Physics, 22, L661, (1983) for determining Ps was used to confirm the presence of an SmC* phase, and to identify the transition temperature boundaries of the SmC* phase. The thermo-optic and electro-optic measurements were undertaken in single pixel devices which were constructed using ITO glass substrates, separated with spacer beads and edge sealed with adhesive. Rubbed polyimide alignment layers were used in the devices. See FIG. 1.

FIG. 1 shows the structure of a typical bistable liquid crystal cell used to test the formulations. The liquid crystalline formulation 17 is placed between two substrates 10, 11. The substrates can be made of any suitable material, such as glass, silicon, organic polymers, or inorganic polymers, for example. One or both of the substrates can be transparent, depending on the class of device.

The inner surfaces of the substrates 10, 11 have electrodes 12, 13, e.g., aluminum or indium tin oxide (ITO), which can be applied in selected regions. One electrode can be on each substrate, or both electrodes can be on one of the substrates (but only one pair of electrodes is required). One or both of the electrodes can be transparent, depending on the device. Alternatively, there can be electrodes providing fringing fields, enabling the electro-optic effects to be controlled. The inner surface of the electrode may be coated with a passivation layer, if desired.

The inner surface of the electrode (adjacent to the liquid crystal material), or the substrate in the case of the fringing field device, is coated with alignment layers 14, 15 in order to facilitate the electric field alignment, the layer orientation and the switching of the SmC* phase. The alignment layer can be an organic coating, or an inorganic coating. Suitable alignment layers include, but are not limited to, polyamide, polyimide, polyester, polytetrafluoroethylene, silicon oxides, silanes, and polysilanes. However, the exact choice of alignment layer material and its preparation conditions are important to realize good alignment and bistability, although the exact selections are dependent on the composition of the formulations. Preferred materials include polyimides with pre-tilt angles of < about 3 degrees; however other materials may also be used. Examples of materials which can be used include polyimides sold under the designations SE130, SE1410, SE8292, and RN1199, available from Nissan Chemical Industries. The alignment layer can be formed by any method known in the art, including, but not limited to, rubbing, stretching, deposition, and embossing. The alignment layer helps the monodomain to form (i.e., "the bookshelf"), and bistable switching to be observed. In order to achieve uniform alignment and bistability, the thickness of alignment layer should be < about 200 nm, or < about 100 nm, or < about 50 nm, or <25 nm.

Spacers 16 separate the substrates 10, 11, and define the cell thickness. A sealing layer 18 is used to retain the liquid crystal material in the cell. The liquid crystal electro-optic devices of the present invention typically have a cell gap designed to be in the range of 0.5 microns to 10 microns.

The laminated device can be placed between polarizers 19, 20 oriented at 90 degrees to each other (optic axis) to generate bright or dark states when the liquid crystal is switched between two states. The device described in FIG. 1 is a transmission mode device. Alternative polarizer configurations, known to those skilled in the art, may be used for transmission and reflective mode devices.

TABLE 1

Chemical structures of components used in formulations.

| Compound Number | Structure |
|---|---|
| C1 | Me₃SiOSiMe₂—(CH₂)₁₁—O—[2,3-difluorophenyl]—[phenyl]—[phenyl]—O—*(CH(CH₃))—C₆H₁₃ |
| C2 | Me₃SiOSiMe₂—(CH₂)₁₁—O—[phenyl]—[2,3-difluorophenyl]—[phenyl]—O—*(CH(CH₃))—C₆H₁₃ |
| C3 | Me₃SiOSiMe₂—(CH₂)₁₁—O—[phenyl]—[phenyl]—[2,3-difluorophenyl]—O—*(CH(CH₃))—C₆H₁₃ |
| C4 | Me₃Si(OSiMe₂)₄—(CH₂)₁₁—O—[2,3-difluorophenyl]—[phenyl]—[phenyl]—O—*(CH(CH₃))—C₆H₁₃ |
| C5 | Me₃SiOSiMe₂—(CH₂)₁₁—O—[2,3-difluorophenyl]—[phenyl]—[phenyl]—O—CH₂—*(CHF)—C₅H₁₁ |
| C6 | Me₃SiOSiMe₂—(CH₂)₄—O—[2,3-difluorophenyl]—[phenyl]—[phenyl]—O—*(CH(CH₃))—C₆H₁₃ |
| C7 | C₁₂H₂₅—[phenyl]—[phenyl]—CN |
| C8 | C₉H₁₉—[phenyl]—[phenyl]—CN |
| C9 | C₅H₁₁—[phenyl]—[phenyl]—CN |
| C10 | Me₃SiOSiMe₂—(CH₂)₈—O—[phenyl]—[phenyl]—CN |
| C11 | Me₃SiOSiMe₂—(CH₂)₁₁—O—[phenyl]—[phenyl]—O—C(=O)—[3-bromo-4-(*(CH(CH₃))—C₆H₁₃)oxyphenyl] |

TABLE 1-continued

Chemical structures of components used in formulations.

| Compound Number | Structure |
|---|---|
| C12 | Me$_3$Si(OSiMe$_2$)$_2$—(CH$_2$)$_{11}$—O—[biphenyl]—O—C(=O)—[phenyl with Br]—O—CH(CH$_3$)—(CH$_2$)$_5$CH$_3$ |
| C13 | Me$_3$Si(OSiMe$_2$)$_4$—(CH$_2$)$_{11}$—O—[phenyl]—C(=O)—O—[phenyl]—O—C(=O)—CH(CH$_3$)—CH$_2$CH$_3$ |
| C14 | Me$_3$SiOSiMe$_2$—(CH$_2$)$_{11}$—O—[phenyl]—C(=O)—O—[phenyl]—O—C(=O)—CH(CH$_3$)—CH$_2$CH$_3$ |
| C15 | Commercial organic FLC formulation purchased from AZ Electronics (Felix015/000). |
| C16 | CH$_3$(CH$_2$)$_7$—O—[phenyl]—[pyrimidine]—(CH$_2$)$_5$CH$_3$ |
| C17 | Me$_3$SiOSiMe$_2$—(CH$_2$)$_8$—O—[phenyl]—[pyrimidine]—(CH$_2$)$_6$CH$_3$ |
| C18 | Me$_3$SiOSiMe$_2$—(CH$_2$)$_8$—O—[phenyl]—[pyrimidine]—(CH$_2$)$_9$CH$_3$ |
| C19 | Me$_3$SiOSiMe$_2$—(CH$_2$)$_7$—O—[phenyl]—[pyrimidine]—(CH$_2$)$_9$CH$_3$ |
| C20 | Me$_3$SiOSiMe$_2$—(CH$_2$)$_{11}$—O—[phenyl]—[pyrimidine]—(CH$_2$)$_6$CH$_3$ |
| C21 | Me$_3$SiOSiMe$_2$—(CH$_2$)$_{11}$—O—[phenyl]—[pyrimidine]—(CH$_2$)$_9$CH$_3$ |
| C22 | Me$_3$SiOSiMe$_2$—(CH$_2$)$_9$—[pyrimidine]—[phenyl]—O—(CH$_2$)$_9$CH$_3$ |
| C23 | Me$_2$SiOSiMe$_2$—(CH$_2$)$_9$—[pyrimidine]—[phenyl]—O—CH$_2$—CHF—(CH$_2$)$_3$CH$_3$ |
| C24 | O—(SiMe$_2$—(CH$_2$)$_8$—O—[phenyl]—[pyrimidine]—(CH$_2$)$_9$CH$_3$)$_2$ |

TABLE 1-continued

Chemical structures of components used in formulations.

| Compound Number | Structure |
|---|---|
| C25 | Me₃Si(OSiMe₂)₄—(CH₂)₄—O—[phenyl]—[difluorophenyl]—O—(CH₂)₇CH₃ |
| C26 | Me₃SiOSiMe₂—(CH₂)₁₀—O—[phenyl]—C(=O)—O—[phenyl]—O—C(=O)—CH(CH₃)—CH(Cl)—CH₂CH₃ |
| C27 | Me₃SiOSiMe₂—(CH₂)₁₀—O—[phenyl]—C(=O)—O—[phenyl]—O—C(=O)—CH(CH₃)—CH(Cl)—CH₂CH₃ (racemic) |
| C28 | Me₃SiOSiMe₂—(CH₂)₄—O—[pyrimidine]—[biphenyl]—(CH₂)₄CH₃ |

TABLE 2

Phase behavior of Cyanobiphenyl based materials used for tilt angle tuning.

| Compound | Phase Behavior |
|---|---|
| C₁₂H₂₅—[biphenyl]—CN | Crystal → 48° C. → SmA → 58.5° C. → Isotropic[*] |
| C₈H₁₇—[biphenyl]—CN | Crystal → 42° C. → SmA → 48° C. Nematic → 49.5° C. → Isotropic[*] |
| C₅H₁₁—[biphenyl]—CN | Crystal → 24° C. → Nematic → 35.3° C. → Isotropic[*] |
| Me₃SiOSiMe₂—(CH₂)₈—O—[biphenyl]—CN | Crystal → 37.0° C. → SmA → 59.0° C. → I[**] |

[*] BDH Data Sheet 851/PP/2.0/0686
[**] M. Ibn-Elhaj et al. J. Phys. II France, 1807-1817 (1993).

TABLE 3

Data for Binary formulations based upon an oligosiloxane-modified terphenyl mesogen and organic cyanobiphenyl mesogens.

| Formulation Number | Composition (by mole percentage) | Phase Sequence | Tilt Angle (degrees) | Ps (nC/cm²) | Rotational Viscosity/cP |
|---|---|---|---|---|---|
| 1 | C1:100 | SmX → 37.6 → SmC* → 85.5 → I | 39 (@40° C.) | 60 (@40° C.) | 950 (@40° C.) |
| 2 | C1:90 C7:10 | SmX → 32.7 → SmC* → 92.4 → I | 31 (@40° C.) | 51 (@40° C.) | 400 (@40° C.) |
| 3 | C1:83 C7:17 | SmX → 28.9 → SmC* → 74.8 → SmA → 95.5 → I | 23 (@40° C.) | 35 (@40° C.) | 120 (@40° C.) |
| 4 | C1:75 C7:25 | SmX → 24.2 → SmA → 97.7 → I | NA | NA | NA |

TABLE 3-continued

Data for Binary formulations based upon an oligosiloxane-modified terphenyl mesogen and organic cyanobiphenyl mesogens.

| Formulation Number | Composition (by mole percentage) | Phase Sequence | Tilt Angle (degrees) | Ps (nC/cm$^2$) | Rotational Viscosity/cP |
|---|---|---|---|---|---|
| 5 | C1:83 C8:17 | SmX → 27.0 → SmC* → 74.2 → SmA → 96.2 → I | 22 (@40° C.) | 31 (@40° C.) | 127 (@40° C.) |
| 6 | C1:90 C9:10 | SmX → 32.0 → SmC* → 93.4 → I | 31 (@40° C.) | 46 (@40° C.) | 555 (@40° C.) |
| 7 | C1:90 C10:10 | SmX → 33.5 → SmC* → 90.3 → I | 34 (@40° C.) | 48 (@40° C.) | — |
| 8 | C1:83 C10:17 | SmX → 28.5 → SmC* → 85.2 → SmA → 93.4 → I | 31 (@40° C.) | 45 (@40° C.) | 900 (@40° C.) |
| 9 | C1:75 C10:25 | SmX → 31.0 → SmC* → 74.7 → SmA → 94.3 → I | 25 (@40° C.) | 32 (@40° C.) | 250 (@40° C.) |
| 10 | C1:87 C15:13† | SmX → 31.3 → SmC* → 83.5 → I | 36 (@40° C.) | 50 (@40° C.) | 465 (@40° C.) |

†N.B. Weight % used for this blend, because C15 is a pre-formulated liquid crystal additive.
[See Table 1 for chemical structures of individual components].

TABLE 4

Data for binary, ternary and quaternary formulations based upon an oligosiloxane-modified terphenyl mesogen and an oligosiloxane-modified cyanobiphenyl mesogen.

| Formulation Number | Composition (by mole percentage) | Phase Sequence | Tilt Angle (degrees) | Ps (nC/cm$^2$) | Rotational Viscosity/cP |
|---|---|---|---|---|---|
| 11 | C1:90 C10:10 | SmX → 33.5 → SmC* → 90.3 → I | 34 (@40° C.) | 48 (@40° C.) | — |
| 12 | C1:48.8 C10:16.2 C22:35 | SmX → 16.4 → SmC* → 66.9 → I | 34 (@40° C.) | 17.7 (@40° C.) | — |
| 13 | C1:49 C10:16 C22:17 C16:18 | SmX → 16.5 → SmC* → 75.0 → I | 28 (@40° C.) 28.8 (@25° C.) | 22 (@40° C.) 19 (@25° C.) | 395 (@40° C.) 795 (@25° C.) |

TABLE 5

Data for formulations containing multiple oligosiloxane-modified terphenyl mesogens

| Formulation Number | Composition (by mole percentage) | Phase Sequence | Tilt Angle (degrees) | Ps (nC/cm$^2$) | Rotational Viscosity/cP |
|---|---|---|---|---|---|
| 14 | C1:50 C4:50 | SmX → 33.3 → SmC* → 82.5 → I | 40 (@40° C.) | 53 (@40° C.) | 580 (@40° C.) |
| 15 | C1:33 C2:33 C3:33 | SmX → 14.5 → SmC* → 84.3 → I | 40.5 (@25° C.) | 95 (@25° C.) | 1880 (@25° C.) |
| 16 | C1:25 C4:25 C22:25 C16:25 | SmX → 11.8 → SmC* → 61.4 → I | — | 18 (@25° C.) 20 (@40° C.) | — |

TABLE 6

Data for formulations containing an oligosiloxane-modified phenylpyrimidine and a chiral oligosiloxane phenylpyrimidine dopant.

| Formulation Number | Composition (by mole percentage) | Phase Sequence | Tilt Angle (degrees) | Ps (nC/cm$^2$) | Rotational Viscosity/cP |
|---|---|---|---|---|---|
| 17 | C17:95 C23:5 | SmX → 22.0 → SmC* → 52.5 → I | 23 (@25° C.) | 3 (@25° C.) | 118 (@25° C.) |
| 18 | C17:90 C23:10 | SmX → −29.7 → SmC* → 51.7 → I | 26 (@25° C.) | 10 (@25° C.) | 147 (@25° C.) |
| 19 | C17:85 C23:15 | SmX → −29.2 → SmC* → 50.5 → I | 27 (@25° C.) 24 (@40° C.) | 16 (@25° C.) 11 (@40° C.) | 175 (@25° C.) 56 (@40° C.) |

TABLE 6-continued

Data for formulations containing an oligosiloxane-modified phenylpyrimidine
and a chiral oligosiloxane phenylpyrimidine dopant.

| Formulation Number | Composition (by mole percentage) | Phase Sequence | Tilt Angle (degrees) | Ps (nC/cm$^2$) | Rotational Viscosity/cP |
|---|---|---|---|---|---|
| 20 | C17:75 C23:25 | SmX → −26.8 → SmC* → 48.7 → I | 30.5 (@25° C.) | 30 (@25° C.) | 135 (@25° C.) |
| 21 | C17:50 C23:50 | SmX → 18.8 → SmC* → 85.6 → I | 36 (@25° C.) | 82 (@25° C.) | 230 (@25° C.) |
| 22 | C18:90 C23:10 | SmX → 24.7 → SmC* → 58.7 → I | 27.5 (@40° C.) | 8 (@40° C.) | 118 (@40° C.) |
| 23 | C19:85 C23:15 | SmX → 39.0 → SmC* → 57.8 → I | 26 (@40° C.) | 17 (@40° C.) | 100 (@40° C.) |
| 24 | C20:85 C23:15 | Cr → 41.0 → SmC* → 56.7 → I | — | 18 (@25° C.) SC | — |
| 25 | C21:85 C23:15 | Cr → 41.5 → SmC* → 60.7 → I | 30 (@40° C.) SC | 17 (@40° C.) SC | 166 (@40° C.) |
| 26 | C17:83.3 C5:1.7 C23:15 | SmX → −30 → SmC* → 51.5 → I | 27.5 (@25° C.) | 19 (@25° C.) | 195 (@25° C.) |
| 27 | C17:76.5 C1:8.5 C23:15 | SmX → 5 → SmC* → 51.2 → I | 29 (@25° C.) | 14 (@25° C.) | 278 (@25° C.) |
| 28 | C17:76.5 C24:8.5 C23:15 | SmX → 19.0 → SmC* → 57.5 → I | 23 (@25° C.) | 9 (@25° C.) | 295 (@25° C.) |
| 29 | C17:76.5 C25:8.5 C23:15 | SmX → −33.5 → SmC* → 45.1 → I | 29 (@25° C.) | 15 (@25° C.) | 181 (@25° C.) |

NB SC = supercooled sample.

TABLE 7

Data for formulations containing oligosiloxane-modified phenylpyrimidines
and various chiral oligosiloxane modified dopants

| Formulation Number | Composition (by mole percentage) | Phase Sequence | Tilt Angle (degrees) | Ps (nC/cm$^2$) | Rotational Viscosity/cP |
|---|---|---|---|---|---|
| 30 | C17:50 C1:50 | SmX → 15.2 → SmC* → 60.6 → I | 35 (@40° C.) | 23 (@40° C.) | 278 (@40° C.) |
| 31 | C22:50 C11:50 | SmX → 12.8 → SmC* → 59.7 → I | 44.5 (@40° C.) | 40 (@40° C.) | 686 (@40° C.) |
| 32 | C17:80 C12:20 | SmX → 4.0 → SmC* → 51.8 → I | 35 (@25° C.) | 12 (@25° C.) | — |

TABLE 8

Data for miscellaneous formulations

| Formulation Number | Composition (by mole percentage) | Phase Sequence | Tilt Angle (degrees) | Ps (nC/cm$^2$) | Rotational Viscosity/cP |
|---|---|---|---|---|---|
| 33 | C17:54.8 C28:20.2 C23:25 | SmX −35.2 SmC* 55.0 I | 39 (@25° C.) | 43 (@25° C.) | 399 (@25° C.) |
| 34 | C1:23 C13:77 | SmX 17.5 SmC* 61.2 I | 41 (@25° C.) | 13 (@25° C.) | 650 (@25° C.) |
| 35 | C1:50 C13:25 C6:25 | SmX 17.2 SmC* 87.4 I | 40 (@40° C.) | 19 (@40° C.) | 320 (@40° C.) |
| 36 | C14:67.5 C15:22.5† C1:10 | SmX −13.3 SmC* 51.4 I | 27 (@25° C.) | 6 (@40° C.) | 42 (@40° C.) |
| 37 | C26:66 C27:33 | Cr 15.3 SmC* 35.9 I | 20 (@30° C.) | 29 (@30° C.) | 319 (@30° C.) |

†N.B. Weight % used for this blend, because C15 is a pre-formulated liquid crystal additive.

EXAMPLE 1

An oligosiloxane liquid crystal C17 was formulated with a non-liquid crystalline oligosiloxane C23. C17 exhibits I→SmA→SmC→Cr phase behavior while C23 is a non-liquid crystalline compound. The binary formulations were found to exhibit I→SmC*→SmX phase behavior, illustrating the unexpected ability to obtain the desired I→SmC* phase behavior from components with different phase behaviors.

| Composition (by mole percentage) | Phase Sequence | Tilt Angle (degrees) | Ps (nC/cm$^2$) |
|---|---|---|---|
| C17:100 | Cr → 16.9 → SmC → 45.6 → SmA → 54.3 → I | NA | NA |
| C17:95 C23:5 | SmX → 22.0 → SmC* → 52.5 → I | 23 (@25° C.) | 3 (@25° C.) |
| C17:90 C23:10 | SmX → −29.7 → SmC* → 51.7 → I | 26 (@25° C.) | 10 (@25° C.) |
| C17:85 C23:15 | SmX → −29.2 → SmC* → 50.5 → I | 27 (@25° C.) | 16 (@25° C.) |
| C17:75 C23:25 | SmX → −26.8 → SmC* → 48.7 → I | 30.5 (@25° C.) | 30 (@25° C.) |
| C17:50 C23:50 | SmX → 18.8 → SmC* → 85.6 → I | 36 (@25° C.) | 82 (@25° C.) |
| C23:100 | Cr → 50.3 → I | NA | NA |

EXAMPLE 2

C1 with I→SmC* phase sequence was mixed at various ratios with C10 which has I→SmA→K phase sequence. Two formulations with different amounts of C10 were prepared. Although C10 only exhibits a SmA phase, all formulations exhibited SmC* phase.

| C1:C10 (mole ratio) | Tilt Angle (°) | Response Time (μs) |
|---|---|---|
| 83:17 | 30.5 | 200 |
| 75:25 | 25 | 50 |

The electro-optical properties of these formulations were measured in a 13 mm×16 mm liquid crystal cells depicted in FIG. 1. The liquid crystal test cells were prepared in the following manner: an ITO coating was photo-patterned with 5 mm×5 mm active area with a contact pad for each. ITO coated glass had a SiO$_2$ coating between glass substrate and the ITO coating, and the sheet resistance of ITO was the 100 ohm/square. A designated alignment agent was spin coated to a thickness of about 25 nm, cured, and then rubbed to form the alignment layer. Spacers of the desired size were blended with UV curable sealant at about 2% (by weight) loading, and this was applied at two edges of a cell on one of the substrates, on top of the alignment layer. It was laminated with another substrate without sealant application with the alignment layers facing inside and with an anti-parallel rubbing orientation. The two substrates were assembled in staggered fashion with 13 mm×13 mm substrates overlap and 5 mm×5 mm counter facing electrodes and with two opposing 3 mm ledges with contact pads for connection to electrical source. The assembly was pressed using vacuum press and irradiated with a UV light source to cure the sealant.

A transmissive liquid crystal device was prepared by filling a cell prepared using nylon as the alignment layer and 3 μm spacers with aforementioned formulations. The ports were then sealed with UV curable sealant and wires were attached by soldering to contact pads for the opposing ITO electrodes to apply an electric field across the liquid crystal formulation.

The filled device was treated by the application of 800 Hz 10 V/μm square wave at a temperature just below the upper limit of SmC* phase resulting in a uniform alignment. This device was then characterized at 40° C. and their tilt angles were found to decrease from 30.5° to 25° when the amount of C10 was increased illustrating the tilt angle tuning behavior of C10. The response time was also found to decrease from 200 to 50 μs when the amount of C10 was increased from 17 mole percent to 25 mole percent.

EXAMPLE 3

C27 and C26 were synthesized, where C27 is a racemized homologue of C26. The Ps of each of these compounds was measured as tabulated in the table below.

| Compounds | Ps (nC/cm$^2$) |
|---|---|
| C27 | ~4 |
| C26 | 134 |

The partial racemic (C27) and chiral (C26) compounds were blended in 2:1 molar ratio to make Formulation 37. The Ps of this formulation was found to be 29 nC/cm$^2$, demonstrating the ability to tune the Ps of the formulation by controlling the enantiomeric excess.

EXAMPLE 4

Figure 2:
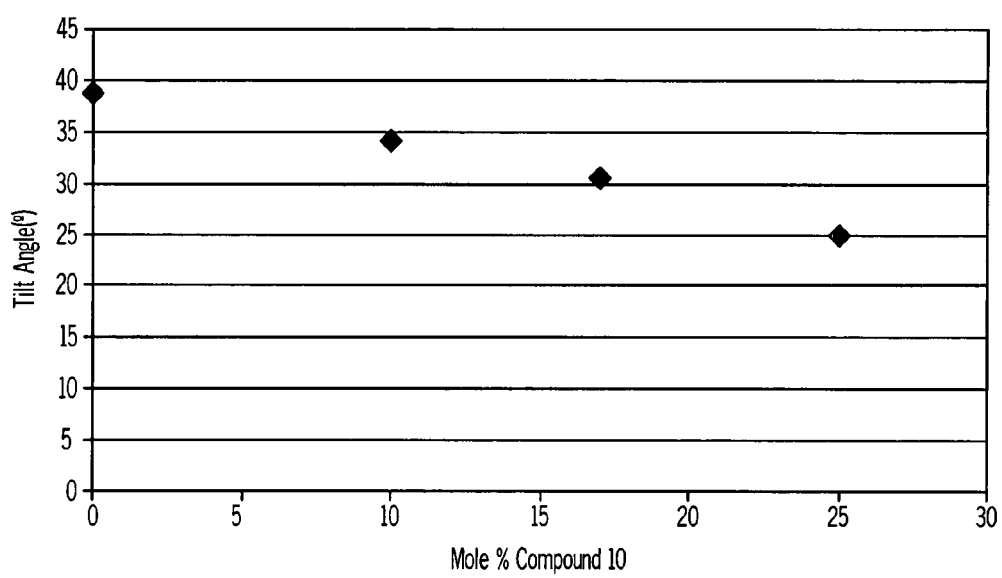
FIG. 2 is a graph showing the tilt angle of a formulation as a function of the amount of a compound having an I→SmA→Cr phase sequence.

C1 was mixed at a various ratios with C10 which has an I→SmA→Cr phase sequence. C10 possesses a strong longitudinal dipole due to the cyano-biphenyl structure, unlike C1 where transverse dipole behavior is exhibited leading to ferroelectric switching. Formulations 7-9 containing different amounts of C10 were prepared and their tilt angles were measured at 40° C. Although C10 only exhibits SmA phase, all formulations exhibited SmC* phase. As shown in FIG. 2, the tilt angles can be tuned by controlling the composition. In alternative formulations, e.g., Formulation 13, and Formulation 2, such additives can be used to tune the tilt angle without the introduction of a discrete SmA* phase in the formulation.

EXAMPLE 5

C1 was mixed at a various ratios with a commercial formulation C15 which exhibits the conventional ferroelectric phase sequence I→N→SmA*→SmC*. As shown in the table below, the phase sequence of the formulation shifts from I→SmA*→SmC* to I→SmC* as the amount of C15 decreases.

| C1:C15 (weight ratio) | Phase Sequence |
| --- | --- |
| 0:100 | I→N→SmA*→SmC* |
| 50:50 | I→SmA*→SmC* |
| 62.5:37.5 | I→SmA*→SmC* |
| 75:25 | I→SmC* |
| 87.5:12.5 | I→SmC* |
| 100:0 (neat C1) | I→SmC* |

Figure 3:
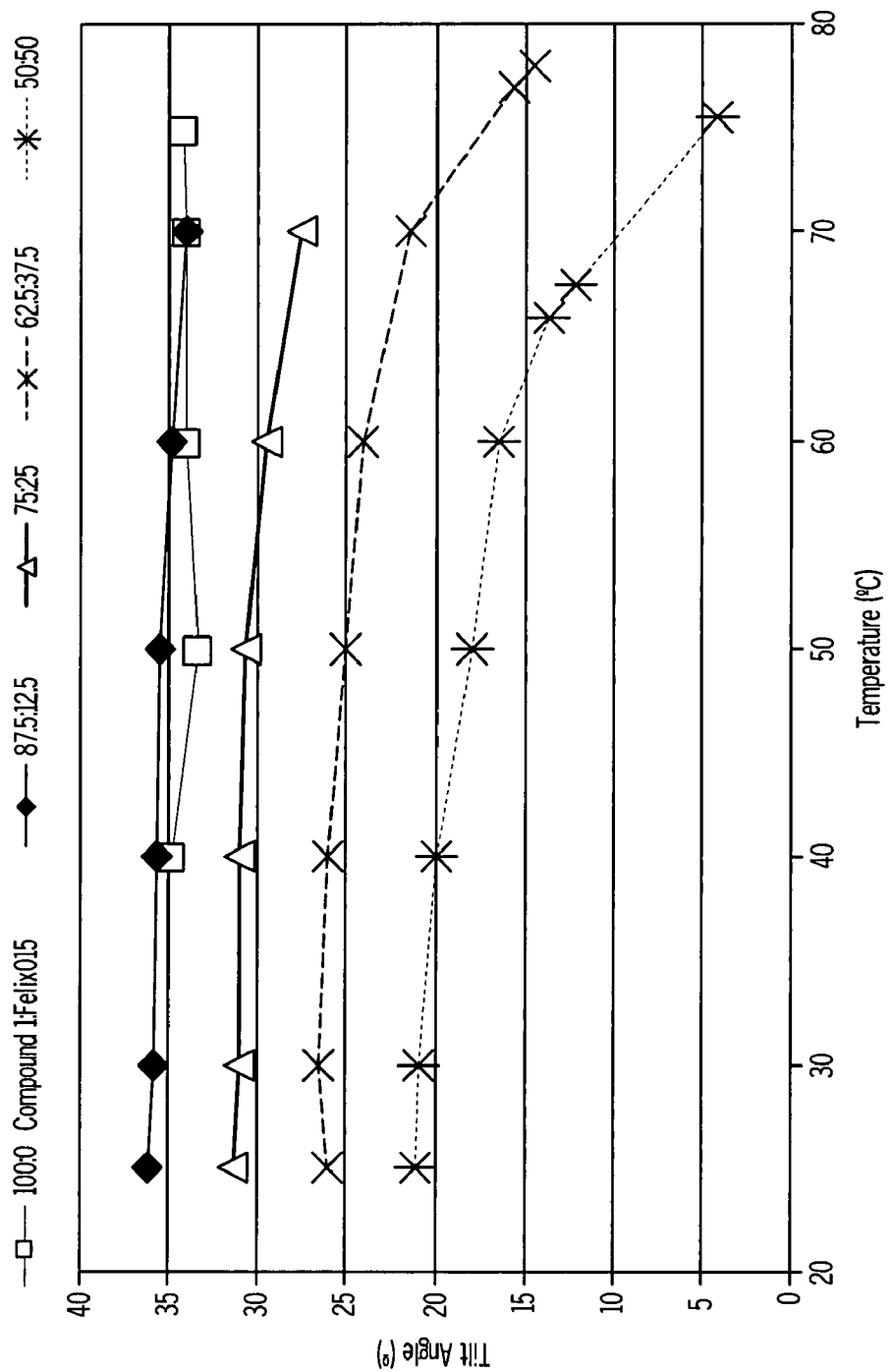
FIG. 3 is a graph showing the temperature dependence of tilt angle for formulations having different ratios of materials having I→SmC* and I→N→SmA*→SmC* phase sequences.

As illustrated in FIG. 3, a weaker temperature dependence of tilt angle is observed in formulations with I→SmC* phase transitions where the content of C15 is lower. A SmA phase was introduced as the amount of C15 increased and at the same time, the temperature dependence of tilt angle also increased. These results indicate the advantage of formulations with I→SmC* phase sequence over those with I→SmA*→SmC* and furthermore, those with less SmA forming component in the formulation leading to FLC formulation with greater temperature stability of tilt angle.

EXAMPLE 6

An oligosiloxane liquid crystal composition 'Formulation 19' was prepared by mixing the following compounds at the quantities shown in the table below. The resulting formulation was characterized to have the phase sequence as shown in Table 6 with SmC* range spanning between −29 and 50° C.

| Formulation 19 | Molar Composition |
| --- | --- |
| C17 | 85 |
| C23 | 15 |

Figure 4A:
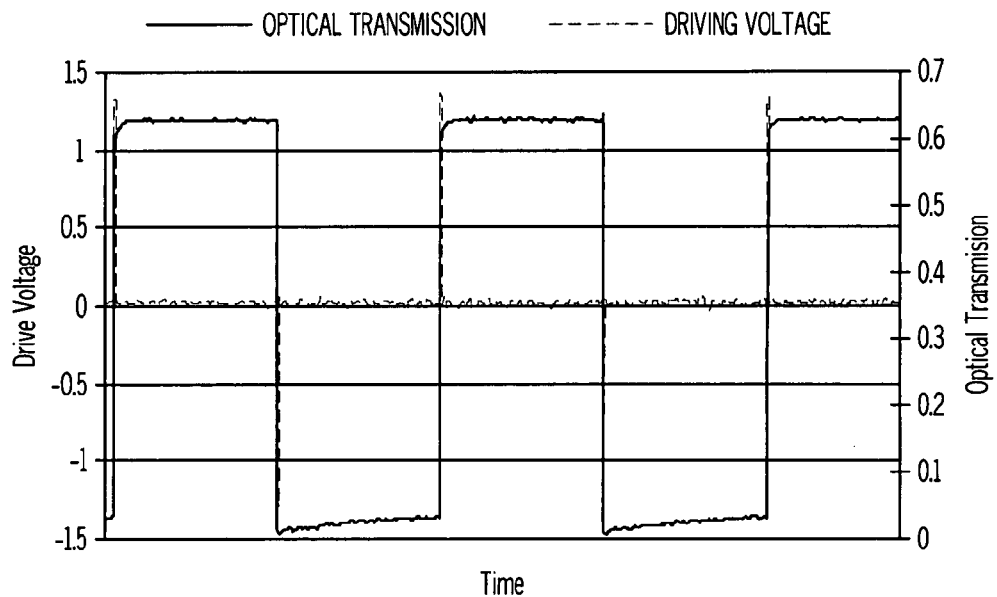
FIGS. 4a and 4b are graphs showing drive voltage and optical transmission as a function of time.
Figure 4B:
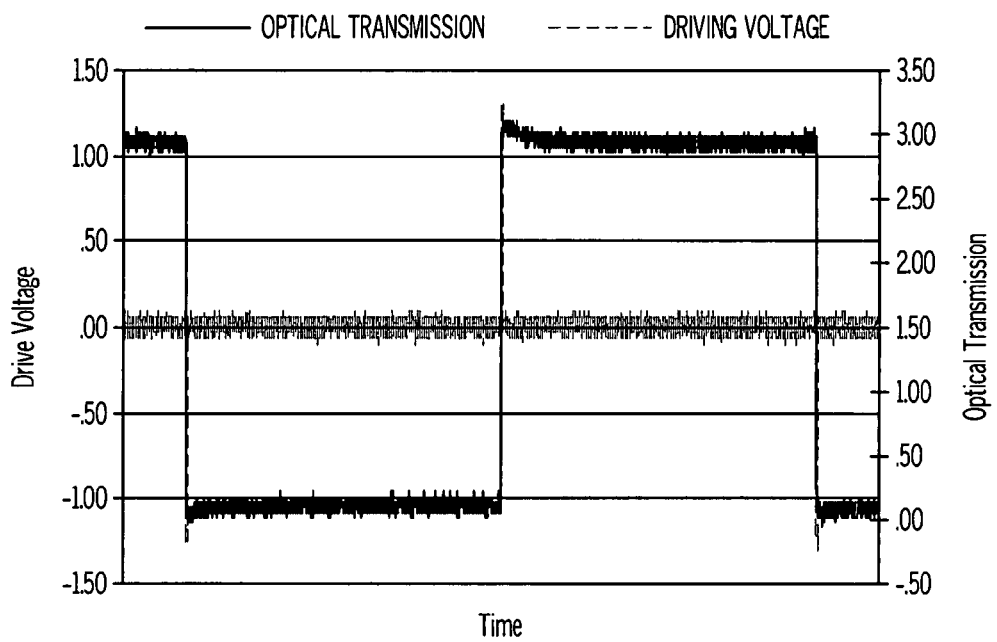

A transmissive liquid crystal device was prepared by filling a cell with Formulation 19 as described in Example 2. Treatment of the filled device by the application of a 30 Hz 10 V/μm square wave while being held at ambient temperature resulted in formation of uniform alignment with a contrast ratio of 9:1. A commercial organic ferroelectric liquid crystal formula from AZ Electronic Materials (Clariant) Felix 015/000 ('Compound' 15) had a contrast ratio of 26:1 under the same conditions. The device prepared using formulation 19 was found to show voltage-on to 90% transmission response time of 64 μs and 135 μs, Ps of 11 nC/cm$^2$ and 16 nC/cm$^2$ and tilt angle of 24° and 27°, at 25° C. and 40° C., respectively. Good bistability with >90% signal retained 20 ms after application of 10 V/μm 200 μs pulse at 25° C. (FIG. 4a). The device prepared using formulation 19 also showed good bistability at 40° C. in a cell with 160 nm thick polyimide alignment layer (FIG. 4b) and driving condition of 130 μs wide 10 V/μm bipolar pulses with 17 ms delay between pulses.

EXAMPLE 7

An oligosiloxane liquid crystal composition 'Formulation 23' was prepared by mixing the following compounds at the composition shown in the table below. The resulting formulation was characterized to have the phase sequence as shown in Table 6 with SmC* range spanning between 39 and 58° C.

| Formulation 23 | Molar Composition |
| --- | --- |
| C19 | 85 |
| C23 | 15 |

Figure 5A:
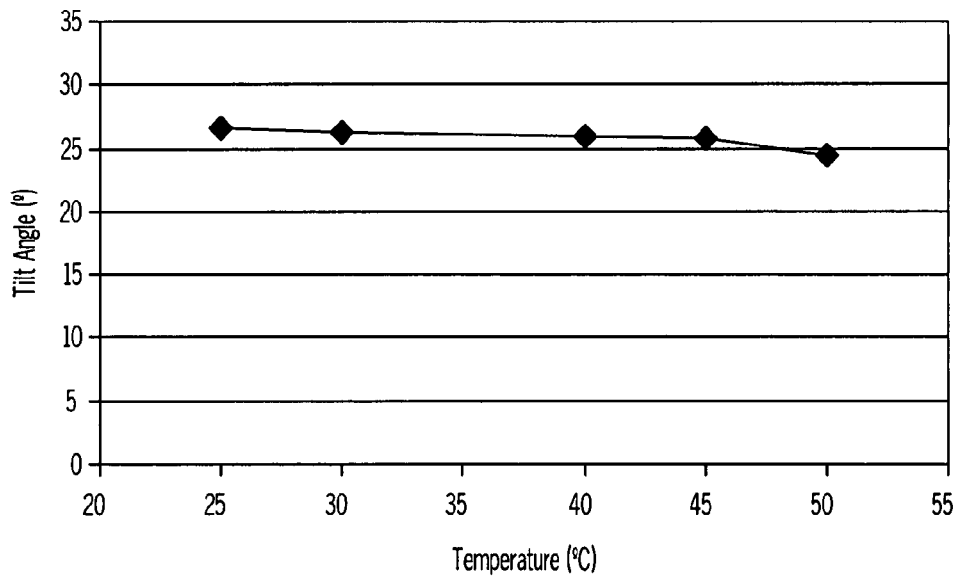
FIG. 5a is a graph showing the temperature dependence of tilt angle and FIG. 5b is a graph showing drive voltage and optical transmission as a function of time.
Figure 5B:
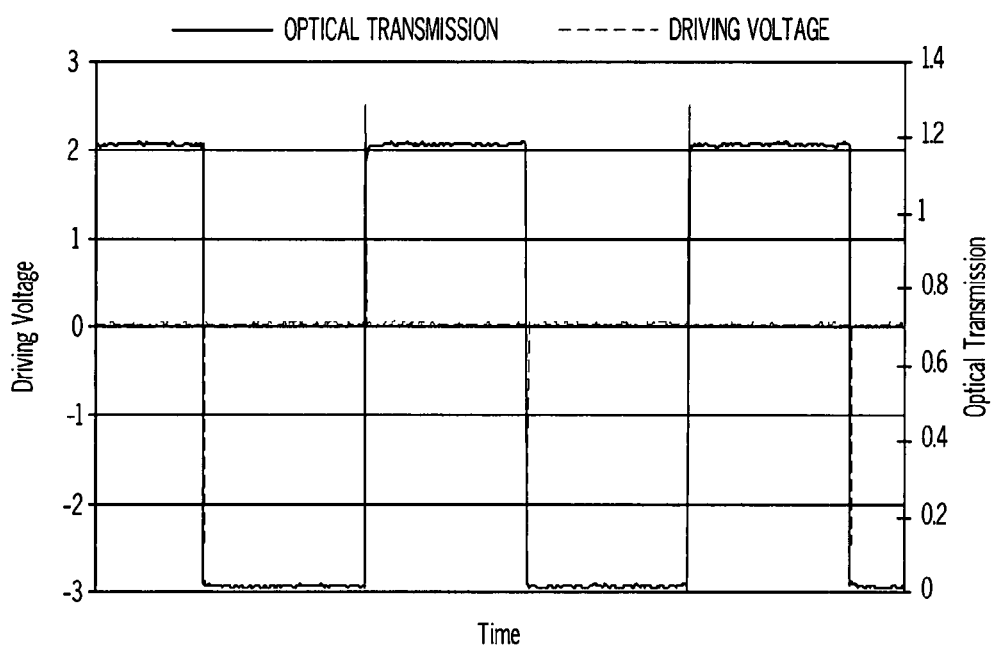

A transmissive liquid crystal device was prepared by filling a cell with Formulation 23 as described in Example 2. Treatment of the filled device by the application of a 5 kHz, 15 V/μm square wave while being held at 50° C. resulted in formation of uniform alignment with a high contrast ratio of 50:1. This device was then characterized at 25° C. and was found to show voltage-on to 90% transmission response time of 75 μs, a Ps of 24 nC/cm$^2$ and a tilt angle of 26.5°. The tilt angle was found to show excellent temperature independence (FIG. 5a). Excellent bistability was observed when driven by 200 μs wide 10 V/μm bipolar pulses and with a 20 ms delay between pulses (FIG. 5b).

EXAMPLE 8

An oligosiloxane liquid crystal composition 'Formulation 33' was prepared by mixing the following compounds at the composition shown in the table below. The resulting formulation was characterized to have the phase sequence as shown in Table 8 with SmC* range spanning between −35 and 55° C.

| Formulation 33 | Molar composition |
| --- | --- |
| C17 | 54.75 |
| C28 | 20.25 |
| C23 | 25 |

Figure 6:
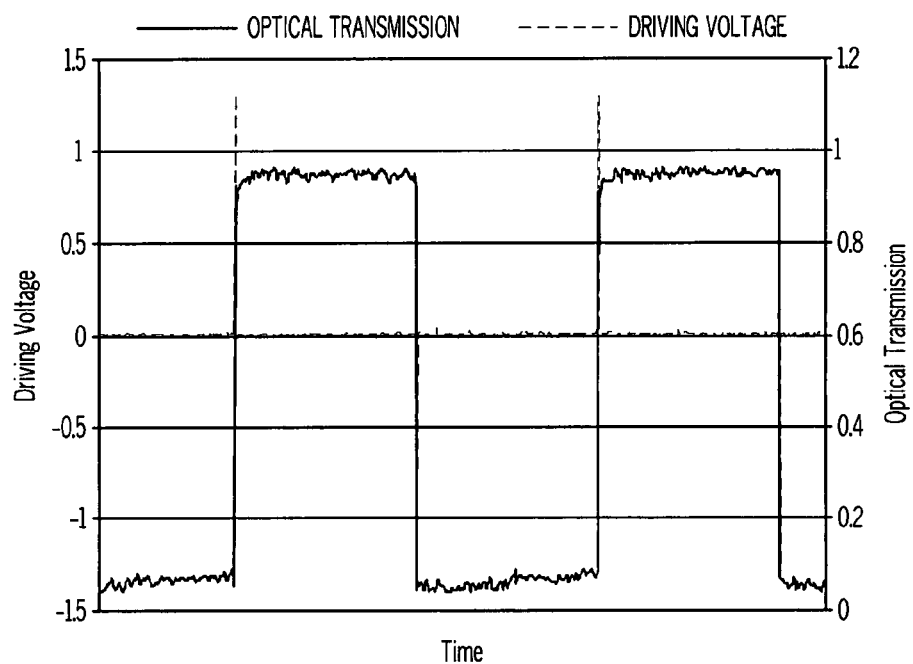
FIG. 6 is a graph showing drive voltage and optical transmission as a function of time.

A transmissive liquid crystal device was prepared by filling a cell with Formulation 33 as described in Example 2. Treatment of the filled device by the application of a 30 Hz, 18 V/μm square wave while being held at ambient temperature resulted in formation of uniform alignment. This device was then characterized at 25° C. and was found to show voltage-on to 90% transmission response time of 132 μs, a Ps of 43 nC/cm$^2$ and tilt angle of 39° at 10 V/μm. Good bistability was observed when driven at 500 μs wide 10 V/μm bipolar pulses with 50 ms delay between pulses (FIG. 6).

The contrast ratio was found to show a relatively low value of 3:1 due to the high value of the tilt angle. The device was also cooled to sub-SmC* phase where no switching takes place, then reheated to SmC* phase where the contrast ratio was measured to be 4:1, thus showing lack of destruction of SmC* alignment.

EXAMPLE 9

An oligosiloxane liquid crystal composition 'Formulation 25' was prepared by mixing the following compounds at the composition shown in the table below. The resulting formulation was characterized to have the phase sequence as shown in Table 6 with SmC* range spanning between 41 and 61° C.

| Formulation 25 | Molar Composition |
| --- | --- |
| C21 | 85 |
| C23 | 15 |

Figure 7:
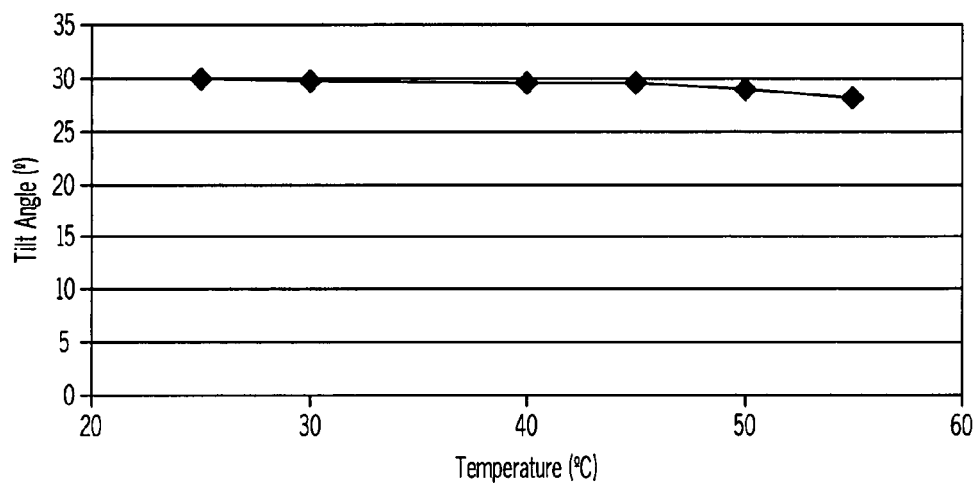
FIG. 7 is a graph showing the temperature dependence of tilt angle.

A transmissive liquid crystal device was prepared by filling a cell with Formulation 25 as described in Example 2. Treatment of the filled device by the application of a 500 Hz, 18 V/μm square wave while being held at 50° C. resulted in formation of uniform alignment with a high contrast ratio of 50:1. This device was then characterized at 25° C. and was found to show voltage-on to 90% transmission response time of 200 μs, Ps of 17 nC/cm² and a tilt angle of 30°. The tilt angle was found to show excellent temperature independence (FIG. 7). This example showed achievement of high contrast ratio in a formulation despite its tilt angle being beyond the optimal range (i.e., contrast ratio should suffer as a result of inferior bright state due to wide tilt angle). The tilt angle can be adjusted to optimal range by using the techniques demonstrated in Examples 1 and 2 to achieve proper property set based on this formulation.

EXAMPLE 10

An oligosiloxane liquid crystal composition 'Formulation 20' was prepared by mixing the following compounds at the composition shown in the table below. The resulting formulation was characterized to have the phase sequence as shown in Table 6 with SmC* range spanning between −27 and 49° C.

| Formulation 20 | Molar Composition |
|---|---|
| C17 | 75 |
| C23 | 25 |

A transmissive liquid crystal device was prepared by filling Formulation 20 into a cell as described in Example 2 with polyimide alignment layer. Treatment of the filled device by the application of a 30 Hz, 10 V/μm square wave while being held at ambient temperature resulted in formation of uniform alignment with a contrast ratio of 34:1. The alignment was found to be retained reasonably well after cooling to a phase below SmC*, and the contrast ratio was found to be 29:1 after reheating.

Figure 8:
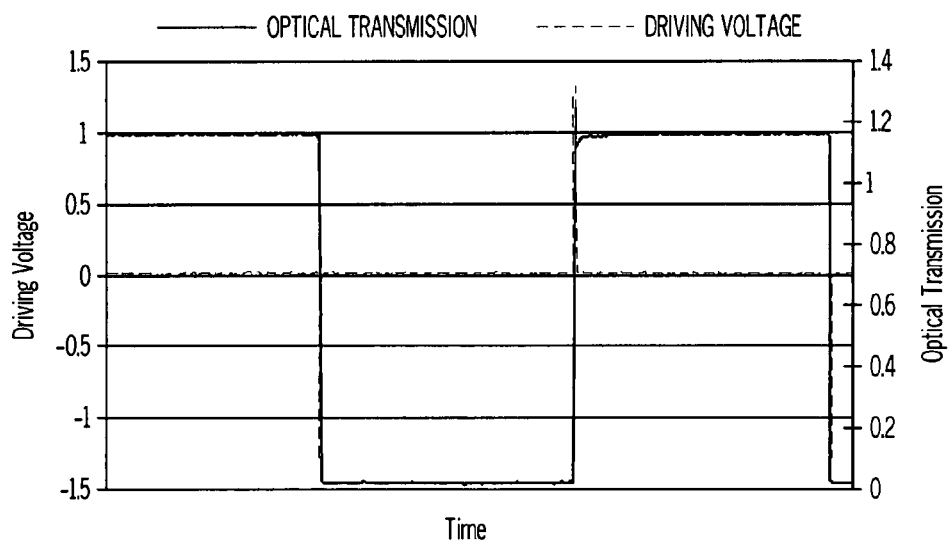
FIG. 8 is a graph showing drive voltage and optical transmission as a function of time.

This device was found to show voltage-on to 90% transmission response time of 66 μs, Ps of 30 nC/cm², and tilt angle of 30.5° at 25° C., respectively. Excellent bistability was observed at 25° C. (FIG. 8) when the device was driven by a 133 μs wide, 10 V/μm bipolar pulses with 13 ms delay between pulses. This example showed achievement of fast response time in a formulation although the tilt angle beyond the optimal range. The tilt angle can be adjusted to optimal range by using the technique demonstrated in Example 2 to achieve proper property set based on this formulation.

EXAMPLE 11

An oligosiloxane liquid crystal composition 'Formulation 31' was prepared by mixing the following compounds at the composition shown in the table below. The resulting formulation was characterized to have the following phase sequence as shown in Table 7 with SmC* range spanning between 13 and 60° C.

| Formulation 31 | Molar Composition |
|---|---|
| C22 | 50 |
| C11 | 50 |

Figure 9:
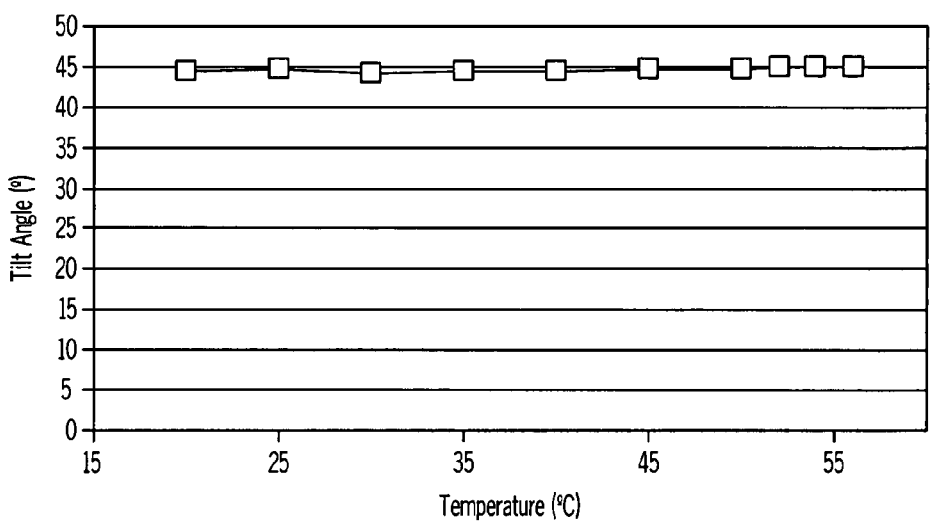
FIG. 9 is a graph showing the temperature dependence of tilt angle.

A transmissive liquid crystal device was prepared by filling a cell with Formulation 31 as described in Example 2 with a polyimide alignment layer. Treatment of the filled device by the application of a 60 Hz 20 V/μm square wave while being held at 55° C. resulted in formation of uniform alignment within 30 min. This device was then characterized at 40° C. and was found to show voltage-on to 90% transmission response time of 300 μs, Ps of 40 nC/cm², and tilt angle of 44.5°. The tilt angle was found to show excellent temperature independence (FIG. 9).

While certain representative embodiments and details have been shown for purposes of illustrating the invention, it will be apparent to those skilled in the art that various changes may be made without departing from the scope of the invention, which is defined in the appended claims.

The invention claimed is:
1. A liquid crystal formulation comprising:
a first oligosiloxane-modified nano-phase segregating liquid crystalline material and
at least one additional material selected from a second oligosiloxane-modified nano-phase segregating liquid crystalline material, non-liquid crystalline oligosiloxane-modified materials, organic liquid crystalline materials, or organic non-liquid crystalline materials,
wherein the liquid crystal formulation is nano-phase segregated in the SmC* phase, has an I→SmC* phase transition, with SmC* temperature range from about 15° C. to about 35° C., has a tilt angle of about 22.5° or about 45°±6°, has a spontaneous polarization of less than about 50 nC/cm², and has a rotational viscosity of less than about 600 cP;
wherein one or more of the first or second oligosiloxane-modified nano-phase segregating liquid crystalline materials is a phenyl benzoate, a biphenyl, a terphenyl, or a phenyl pyrimidine, such that the phenyl pyrimidine has a formula

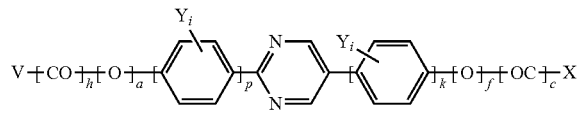

or

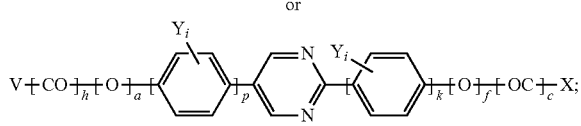

where a=0 or 1; c=0 or 1; f=0 or 1; h=0 or 1; i=0-4; k=0, 1, or 2; p=0, 1, or 2; with the proviso that if f=0, c=0; with the proviso that if a=0, h=0; Y is independently selected from halogen, $NO_2$, CN, $CH_3$, $CF_3$, or $OCF_3$; X=an alkyl or a substituted alkyl with at least one chiral centre, where individual chiral groups can be racemic or non-racemic, provided that the individual chiral groups are selected so that the liquid crystal formulation is non-racemic; and V is

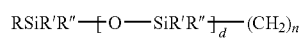

with n=3-15; d=1-5; and R' and R" are independently selected from $C_rH_{(2r+1)}$ and r=1-4, or a phenyl group; R is an alkyl group having from 1 to 10 carbon atoms or one of W, W', or W";

wherein W is

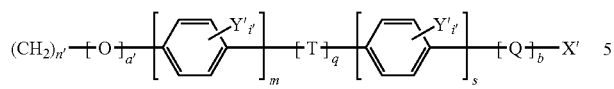

with n'=3-15; a'=0 or 1; m=1 or 2; s=1 or 2; q=0 or 1; b=0 or 1; i'=0-4; T=O, COO, OCO, CH=N, N=CH, CF$_2$O, OCF$_2$, NHCO, CONH, CH$_2$, CH$_2$CH$_2$, C≡C, —CH=CH—, or CF$_2$CF$_2$; Y' is independently selected from halogen, NO$_2$, CN, CH$_3$, CF$_3$, OCF$_3$; Q=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic;
W' is

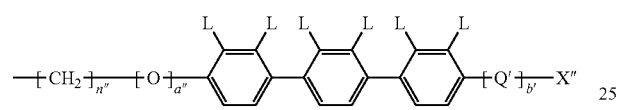

with n''=3-15; a''=0 or 1; b'=0 or 1; L is independently selected from H, halogen, NO$_2$, CN, CH$_3$, CF$_3$, OCF$_3$; Q'=O, COO or OCO; and X''=an alkyl; or substituted alkyl with at least one chiral centre, where individual chiral groups can be racemic or non-racemic, provided that the individual chiral groups are selected so that the liquid crystal formulation is non-racemic; and
W'' is one of

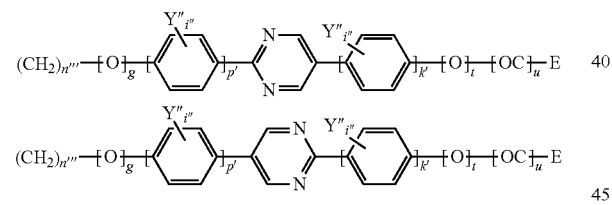

with n'''=3-15; q=0 or 1; p'=0, 1, or 2; k' is 0,1, or 2; i''=0-4; t is 0 or 1; u=0 or 1; with the proviso that when t=0, u=0, Y'' is independently selected from halogen, NO$_2$, CN, CH$_3$, CF$_3$, or OCF$_3$; E is an alkyl; or substituted alkyl with at least one chiral centre, where individual chiral groups can be racemic or non-racemic, provided that the individual chiral groups are selected so that the liquid crystal formulation is non-racemic;
the terphenyl has a formula

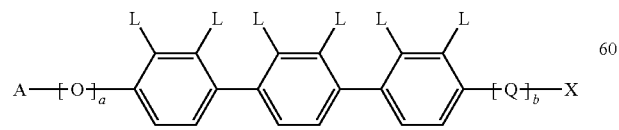

where a=0 or 1; b=0 or 1; L is independently selected from halogen, NO$_2$, CN, CH$_3$, CF$_3$ or OCF$_3$; Q=O, COO, or OCO; X=an alkyl, or substituted alkyl with at least one chiral centre, where individual chiral groups can be racemic or non-racemic, provided that the individual chiral groups are selected so that the liquid crystal formulation is non-racemic; and A is

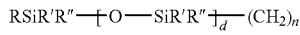

with n=3-15; d=1-5; and R' and R'' are independently selected from C$_r$H$_{(2r+1)}$ and r=1-4, or a phenyl group; R is an alkyl group having from 1 to 10 carbon atoms or one of W, W', or W'';
wherein W is

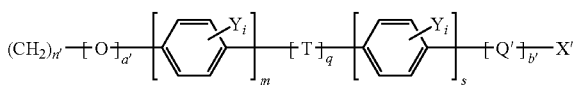

with n'=3-15; a'=0 or 1; m=1 or 2; s=1 or 2; q=0 or 1; b'=0 or 1; i=1-4; T=O, COO, OCO, CH=N, N=CH, CF$_2$O, OCF$_2$, NHCO, CONH, CH$_2$, CH$_2$CH$_2$, C≡C, —CH=CH—, or CF$_2$CF$_2$; Y is independently selected from halogen, NO$_2$, CN, CH$_3$, CF$_3$, OCF$_3$; Q'=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic;
W' is

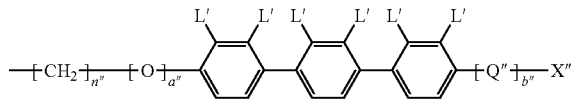

with n''=3-15; a''=0 or 1; b''=0 or 1; L' is independently selected from H, halogen, NO$_2$, CN, CH$_3$, CF$_3$, OCF$_3$; Q''=O, COO, or OCO; and X''=an alkyl; or substituted alkyl with at least one chiral centre, where individual chiral groups can be racemic or non-racemic, provided that the individual chiral groups are selected so that the liquid crystal formulation is non-racemic; and
W'' is one of

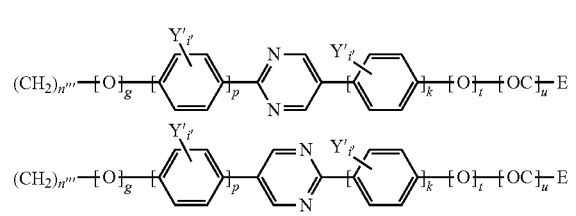

with n'''=3-15; q=0 or 1; p=0, 1, or 2; k is 0, 1, or 2; l'=0-4; t is 0 or 1; u=0 or 1; with the proviso that when t=0, u=0, Y' is independently selected from halogen, NO$_2$, CN, CH$_3$, CF$_3$, or OCF$_3$; E is an alkyl; or substituted alkyl with at least one chiral centre, where individual chiral groups can be racemic or non-racemic, provided that the individual chiral groups are selected so that the liquid crystal formulation is non-racemic; and the phenyl benzoate or biphenyl has a formula

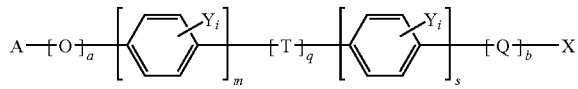

where a=0 or 1; m=1 or 2; s=1 or 2; q=0 or 1; b=0 or 1; l=0-4; T=O, COO, OCO, CH=N, N=CH, CF$_2$O, OCF$_2$, NHCO, CONH, CH$_2$, CH$_2$CH$_2$, C≡C, —CH=CH—, or CF$_2$CF$_2$; Y is independently selected from halogen, NO$_2$, CN, CH$_3$, CF$_3$, or OCF$_3$; Q=O, COO, or OCO; X=an alkyl; or substituted alkyl with at least one chiral centre, where individual chiral groups can be racemic or non-racemic, provided that the individual chiral groups are selected so that the liquid crystal formulation is non-racemic; and A is

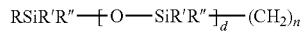

with n=3-15; d=1-5; and R' and R" are independently selected from C$_r$H$_{(2r+1)}$ and r=1-4, or a phenyl group; R is an alkyl group having from 1 to 10 carbon atoms or the group W;

wherein W is

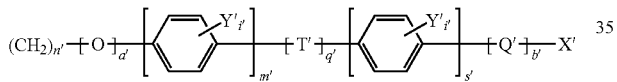

with n'=3-15; a'=0 or 1; m'=1 or 2; s'=1 or 2; q'=0 or 1; b'=0 or 1; l'=0-4; T'=O, COO, OCO, CH=N, N=CH, CF$_2$O, OCF$_2$, NHCO, CONH, CH$_2$, CH$_2$CH$_2$, C≡C, —CH=CH—, or CF$_2$CF$_2$; Y' is independently selected from halogen, NO$_2$, CN, CH$_3$, CF$_3$, OCF$_3$; Q'=O, COO, or OCO; and X'=an alkyl; or substituted alkyl with at least one chiral centre, where individual chiral groups can be racemic or non-racemic, provided that the individual chiral groups are selected so that the liquid crystal formulation is non-racemic.

2. A liquid crystal formulation comprising:

a first oligosiloxane-modified nano-phase segregating liquid crystalline material and at least one additional material selected from a second oligosiloxane-modified nano-phase segregating liquid crystalline material, non-liquid crystalline oligosiloxane-modified materials, organic liquid crystalline materials, or organic non-liquid crystalline materials, wherein the liquid crystal formulation is nano-phase segregated in the SmC* phase, has an I→SmC* phase transition, with SmC* temperature range from about 15° C. to about 35° C., has a tilt angle of about 22.5° or about 45°±6°, has a spontaneous polarization of less than about 50 nC/cm$^2$, and has a rotational viscosity of less than about 600 cP;

wherein the additional material has a formula:

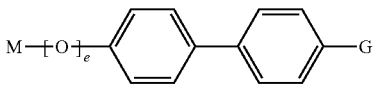

where e=0 or 1; G is H, halogen, an epoxide, NO$_2$, CN, CH$_3$, CF$_3$, or OCF$_3$; M is an alkyl; substituted alkyl with at least one chiral centre, where individual chiral groups can be racemic or non-racemic, provided that the individual chiral groups are selected so that the liquid crystal formulation is non-racemic; or the group

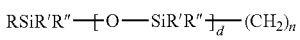

where n=3-15; d=1-5; and R' and R" are independently selected from C$_r$H$_{(2r+1)}$ and r=1-4, or a phenyl group; R is an alkyl group having from to 10 carbon atoms, or Z, where Z is

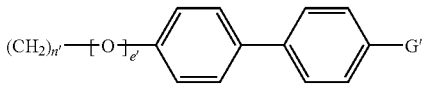

where n'=3-15; e'=0 or 1; G' is H, halogen, an epoxide, NO$_2$, CN, CH$_3$, CF$_3$, or OCF$_3$.

3. A liquid crystal formulation comprising:

a first oligosiloxane-modified nano-phase segregating liquid crystalline material and at least one additional material selected from a second oligosiloxane-modified nano-phase segregating liquid crystalline material, non-liquid crystalline oligosiloxane-modified materials, organic liquid crystalline materials, or organic non-liquid crystalline materials, wherein the liquid crystal formulation is nano-phase segregated in the SmC* phase, has an I→SmC* phase transition, with SmC* temperature range from about 15° C. to about 35° C., has a tilt angle of about 22.5° or about 45°±6°, has a spontaneous polarization of less than about 50 nC/cm$^2$, and has a rotational viscosity of less than about 600 cP;

wherein the additional material has a formula of one of

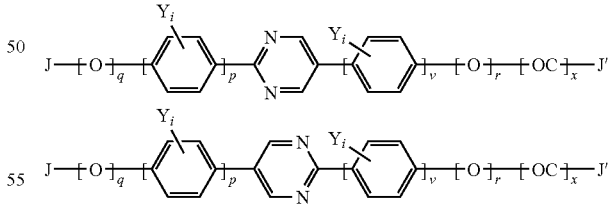

where r=0 or 1; p=0, 1, or 2; v=0, 1, or 2; x=0 or 1; q=0 or 1; i=0-4; with the when r=0, x=0; Y is independently selected from halogen, NO$_2$, CN, CH$_3$, CF$_3$, or OCF$_3$; J and J' are independently selected from an alkyl; or substituted alkyl with at least one chiral centre, where individual chiral groups can be racemic or non-racemic, provided that the individual chiral groups are selected to ensure that the liquid crystal formulation is non-racemic.

4. The liquid crystal formulation of claim 1 wherein the spontaneous polarization is less than about 40 nC/cm$^2$.

5. The liquid crystal formulation of claim 1 wherein the liquid crystal formulation has an I→SmC*→SmX phase transition.

6. The liquid crystal formulation of claim 1 wherein the first or second oligosiloxane-modified nano-phase segregating liquid crystalline material has an ABA structure.

7. The liquid crystal formulation of claim 1 wherein the liquid crystal formulation has a birefringence of more than about 0.05.

8. A device containing a liquid crystal formulation of claim 1, the device having a stable bookshelf geometry, bistable switching, and isothermal electric field alignment in the SmC* phase, the device having a response time of less than 500 μs when switched between two stable states, and an electric drive field of less than about 30 V/μm.

9. The device of claim 8 comprising:
at least one liquid crystal cell comprising:
  a pair of substrates having a gap therebetween;
  a pair of electrodes, the pair of electrodes positioned on one of the substrates or one electrode positioned on each substrate; and
  the liquid crystal formulation of claim 1 disposed in the gap between the pair of substrates.

10. The device of any of claim 9 further comprising at least one polarizer.

11. The device of claim 9 wherein the device further comprises a rubbed alignment layer.

12. The device of claim 11 wherein the alignment layer is a polyimide based material.

13. The device of claim 10 wherein the alignment layer has a thickness less than 200 nm.

14. A device of claim 10 having response time of less than about 100 μs when switched between two stable states.

15. The device of claim 10 wherein the electric drive field is less than about 10 V/μm.

16. The device of claim 10 wherein the device has a contrast ratio of at least 10:1 in the case where the tilt angle is 22.5 degrees±6 degrees.

17. The device of claim 10 wherein the device has a relaxation of less than about 10% in transmission intensity after 20 ms after removal of the electric drive field.

* * * * *